(12) United States Patent
Sumasu

(10) Patent No.: US 10,587,215 B2
(45) Date of Patent: Mar. 10, 2020

(54) MOTOR CONTROL UNIT

(71) Applicant: JTEKT CORPORATION, Osaka-shi, Osaka (JP)

(72) Inventor: Hiroshi Sumasu, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/216,710

(22) Filed: Dec. 11, 2018

(65) Prior Publication Data

US 2019/0190431 A1 Jun. 20, 2019

(30) Foreign Application Priority Data

Dec. 19, 2017 (JP) ................................. 2017-242896

(51) Int. Cl.
*H02P 27/08* (2006.01)
*B62D 5/04* (2006.01)
*H02P 21/22* (2016.01)
*H02P 21/20* (2016.01)

(52) U.S. Cl.
CPC .......... *H02P 27/085* (2013.01); *B62D 5/0463* (2013.01); *H02P 21/20* (2016.02); *H02P 21/22* (2016.02); *H02P 27/08* (2013.01)

(58) Field of Classification Search
CPC ....... B62D 5/0457; B62D 5/0484; H02P 6/10; H02P 21/05; H02P 27/085; H02P 27/08; H02M 7/487
See application file for complete search history.

(56) References Cited

U.S. PATENT DOCUMENTS

| | | | |
|---|---|---|---|
| 7,248,016 B2 * | 7/2007 | Hidaka | B62D 5/046 318/432 |
| 7,830,106 B2 * | 11/2010 | Fukuchi | H02P 21/22 318/400.02 |
| 2007/0222406 A1 * | 9/2007 | Atarashi | H02P 21/0089 318/494 |
| 2010/0264860 A1 * | 10/2010 | Jun | H02P 21/06 318/400.02 |

(Continued)

FOREIGN PATENT DOCUMENTS

| | | |
|---|---|---|
| EP | 3297155 A1 | 3/2018 |
| JP | S64-50766 A | 2/1989 |

OTHER PUBLICATIONS

Apr. 17, 2019 extended search Report issued in European Patent Application No. 18213536.8.

*Primary Examiner* — Rina I Duda
(74) *Attorney, Agent, or Firm* — Oliff PLC

(57) ABSTRACT

A motor control unit includes a PWM count calculator, a PWM count setter, and a PWM count changer. The PWM count calculator calculates first PWM counts of phases. Each first PWM count is calculated for a current control period. The PWM count setter sets the first PWM count of each phase as a second PWM count of a corresponding phase. The second PWM count is set for each of PWM periods included in the current control period. The PWM count changer changes the second PWM count of at least one of the phases, without changing the total of the second PWM counts of the at least one phase within the current control period, such that the number of times switching elements corresponding to the at least one phase are switched within the current control period is reduced.

5 Claims, 14 Drawing Sheets

(56) References Cited

U.S. PATENT DOCUMENTS

| | | | |
|---|---|---|---|
| 2010/0283414 A1* | 11/2010 | Jun | D06F 37/304 |
| | | | 318/400.02 |
| 2013/0009585 A1* | 1/2013 | Hashimoto | H02P 27/045 |
| | | | 318/503 |
| 2013/0062138 A1 | 3/2013 | Naitou et al. | |
| 2014/0292237 A1* | 10/2014 | Yamazaki | H02P 6/183 |
| | | | 318/400.02 |

* cited by examiner

FIG. 9A

| PERIOD NUMBER i | 1 | 2 | 3 | 4 | 5 | 6 | 7 | 8 | TOTAL |
|---|---|---|---|---|---|---|---|---|---|
| Cu SET IN S1 | 400 | 400 | 400 | 400 | 400 | 400 | 400 | 400 | 3200 |
| Cv SET IN S1 | 300 | 300 | 300 | 300 | 300 | 300 | 300 | 300 | 2400 |
| Cw SET IN S1 | 100 | 100 | 100 | 100 | 100 | 100 | 100 | 100 | 800 |

FIG. 9B

| PERIOD NUMBER i | 1 | 2 | 3 | 4 | 5 | 6 | 7 | 8 | TOTAL |
|---|---|---|---|---|---|---|---|---|---|
| FIRST VARIATION PATTERN | x | -x | x | -x | x | -x | x | -x | 0 |
| SECOND VARIATION PATTERN | x | x | -x | -x | x | x | -x | -x | 0 |

FIG. 9C

| PERIOD NUMBER i | 1 | 2 | 3 | 4 | 5 | 6 | 7 | 8 | TOTAL |
|---|---|---|---|---|---|---|---|---|---|
| U-PHASE VARIATION PATTERN | 100 | 100 | -100 | -100 | 100 | 100 | -100 | -100 | 0 |
| V-PHASE VARIATION PATTERN | 200 | 200 | -200 | -200 | 200 | 200 | -200 | -200 | 0 |
| W-PHASE VARIATION PATTERN | 100 | 100 | -100 | -100 | 100 | 100 | -100 | -100 | 0 |

FIG. 9D

| PERIOD NUMBER i | 1 | 2 | 3 | 4 | 5 | 6 | 7 | 8 | TOTAL |
|---|---|---|---|---|---|---|---|---|---|
| FINAL Cu | 500 | 500 | 300 | 300 | 500 | 500 | 300 | 300 | 3200 |
| FINAL Cv | 500 | 500 | 100 | 100 | 500 | 500 | 100 | 100 | 2400 |
| FINAL Cw | 200 | 200 | 0 | 0 | 200 | 200 | 0 | 0 | 800 |

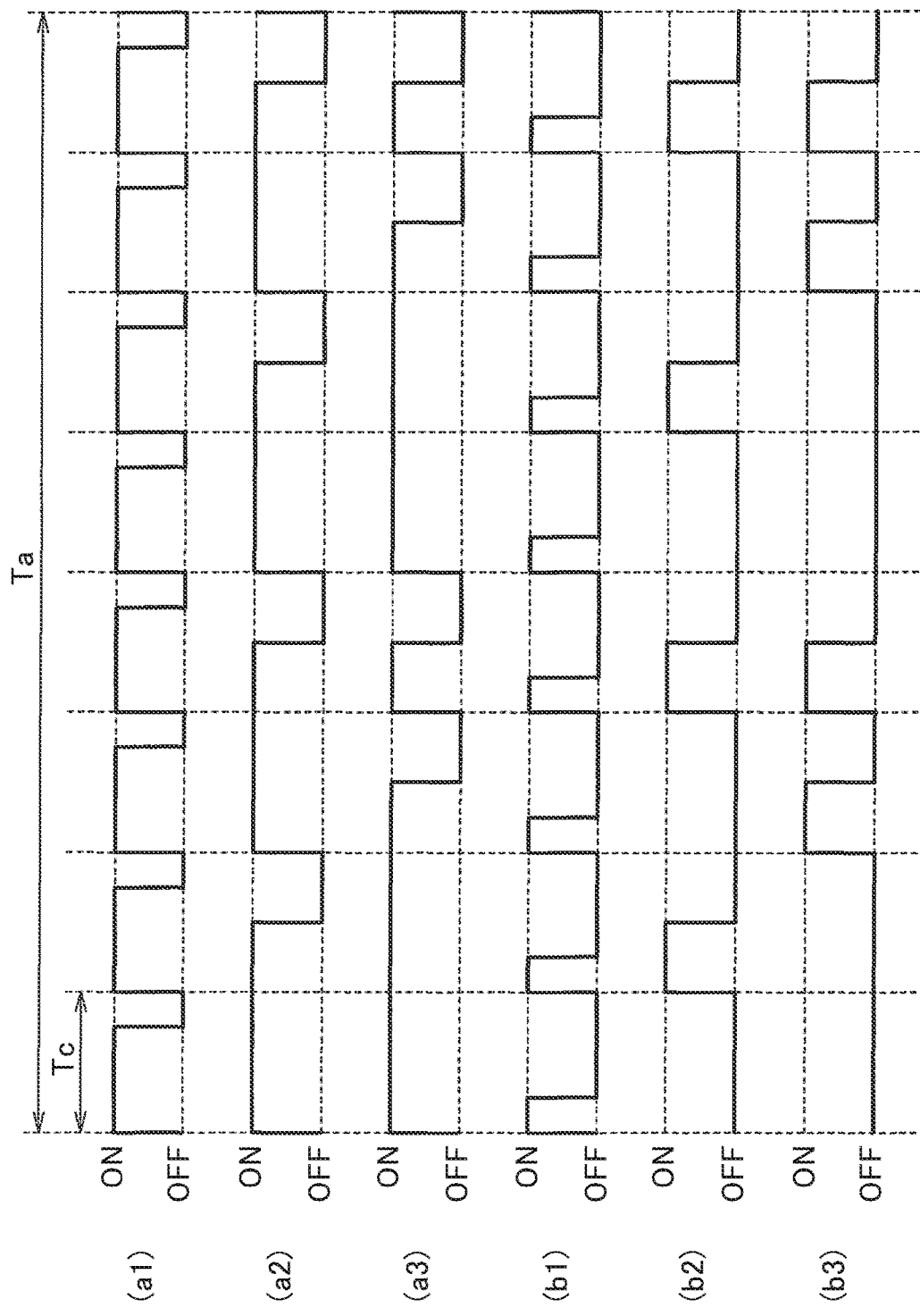

FIG. 13A

| PERIOD NUMBER i | 1 | 2 | 3 | 4 | 5 | 6 | 7 | 8 | TOTAL |
|---|---|---|---|---|---|---|---|---|---|
| Cu SET IN S1 | 800 | 800 | 800 | 800 | 800 | 800 | 800 | 800 | 6400 |
| Cv SET IN S1 | 600 | 600 | 600 | 600 | 600 | 600 | 600 | 600 | 4800 |
| Cw SET IN S1 | 200 | 200 | 200 | 200 | 200 | 200 | 200 | 200 | 1600 |

FIG. 13B

| PERIOD NUMBER i | 1 | 2 | 3 | 4 | 5 | 6 | 7 | 8 | TOTAL |
|---|---|---|---|---|---|---|---|---|---|
| FIRST VARIATION PATTERN | x | -x | x | -x | x | -x | x | -x | 0 |
| SECOND VARIATION PATTERN | x | x | -x | -x | x | x | -x | -x | 0 |

FIG. 13C

| PERIOD NUMBER i | 1 | 2 | 3 | 4 | 5 | 6 | 7 | 8 | TOTAL |
|---|---|---|---|---|---|---|---|---|---|
| U-PHASE VARIATION PATTERN | 200 | -200 | 200 | -200 | 200 | -200 | 200 | -200 | 0 |
| V-PHASE VARIATION PATTERN | 400 | -400 | 400 | -400 | 400 | -400 | 400 | -400 | 0 |
| W-PHASE VARIATION PATTERN | 200 | -200 | 200 | -200 | 200 | -200 | 200 | -200 | 0 |

FIG. 13D

| PERIOD NUMBER i | 1 | 2 | 3 | 4 | 5 | 6 | 7 | 8 | TOTAL |
|---|---|---|---|---|---|---|---|---|---|
| FINAL Cu | 1000 | 600 | 1000 | 600 | 1000 | 600 | 1000 | 600 | 6400 |
| FINAL Cv | 1000 | 200 | 1000 | 200 | 1000 | 200 | 1000 | 200 | 4800 |
| FINAL Cw | 400 | 0 | 400 | 0 | 400 | 0 | 400 | 0 | 1600 |

MOTOR CONTROL UNIT

INCORPORATION BY REFERENCE

The disclosure of Japanese Patent Application No. 2017-242896 filed Dec. 19, 2017 including the specification, drawings and abstract, is incorporated herein by reference in its entirety.

BACKGROUND OF THE INVENTION

1. Field of the Invention

The invention relates to a motor control unit for driving an electric motor by pulse width modulation (PWM).

2. Description of Related Art

In a motor control unit that performs vector control of a three-phase electric motor, a two-phase current command value is calculated with a current control period. A two-phase voltage command value is calculated on the basis of a deviation between the two-phase current command value and a two-phase current detected value. The two-phase voltage command value is subjected to two-phase to three-phase conversion that uses a rotation angle of the electric motor to calculate U-phase, V-phase, and W-phase voltage command values (a three-phase voltage command value). Then, a U-phase PWM signal with a duty cycle corresponding to the U-phase voltage command value, a V-phase PWM signal with a duty cycle corresponding to the V-phase voltage command value, and a W-phase PWM signal with a duty cycle corresponding to the W-phase voltage command value are generated and supplied to a three-phase inverter circuit (a motor drive circuit).

Six switching elements that form the three-phase inverter circuit are controlled by the U-phase, V-phase, and W-phase PWM signals so that a voltage corresponding to the three-phase voltage command value is applied to the three-phase electric motor. Thus, a motor current flowing through the three-phase electric motor is controlled to follow the two-phase current command value (refer to Japanese Patent Application Publication No. H1-50766).

A motor control unit such as described above includes a heatsink to cool switching elements of a three-phase inverter circuit because the switching elements generate heat. The use of the heatsink may increase the size of the motor control unit.

SUMMARY OF THE INVENTION

A purpose of the invention is to provide a motor control unit for suppressing heat generated by a drive circuit.

An aspect of an invention provides a motor control unit including a drive circuit that supplies electric power to an electric motor and that has a plurality of series circuits each of which includes upper switching element and lower switching element connected in series with each other. Each series circuit is connected in parallel to a power source and is provided for a corresponding one of phases of the electric motor. The motor control unit controls the switching elements of the drive circuit on the basis of pulse width modulation (PWM) signals generated for each of PWM periods included in a current control period. The motor control unit further includes a PWM count calculator, a PWM count setter, and a PWM count changer. The PWM count calculator calculates first PWM counts of the plurality of phases. Each first PWM count is calculated for the current control period. The PWM count setter sets each of the first PWM counts of the plurality of phases as a second PWM count of a corresponding one of the plurality of phases. The second PWM count is set for each of the PWM periods within the current control period. The PWM count changer changes the second PWM count of at least one of the plurality of phases, without changing the total of the second PWM counts of the at least one phase within the current control period, such that the number of times the switching elements corresponding to the at least one phase are switched within the current control period is reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9A is a diagram illustrating an example of a PWM count of each phase that is set in step S1 for each PWM period when the carrier waveform is a triangular wave;

FIG. 9B is a diagram illustrating an example of two types of variation patterns;

FIG. 9C is a diagram illustrating an example of a variation of each phase for each PWM period;

FIG. 9D is a diagram illustrating an example of a final PWM count of each phase for each PWM period;

FIG. 12 is a diagram explaining a basic concept of how the switching frequency reducer reduces the number of times of switching;

FIG. 13A is a diagram illustrating an example of a PWM count of each phase that is set in step S1 for each PWM period when the carrier waveform is a sawtooth wave;

FIG. 13B is a diagram illustrating an example of two types of variation patterns;

FIG. 13C is a diagram illustrating an example of a variation of each phase for each PWM period;

FIG. 13D is a diagram illustrating an example of a final PWM count of each phase for each PWM period.

DETAILED DESCRIPTION OF EMBODIMENTS

Figure 1:
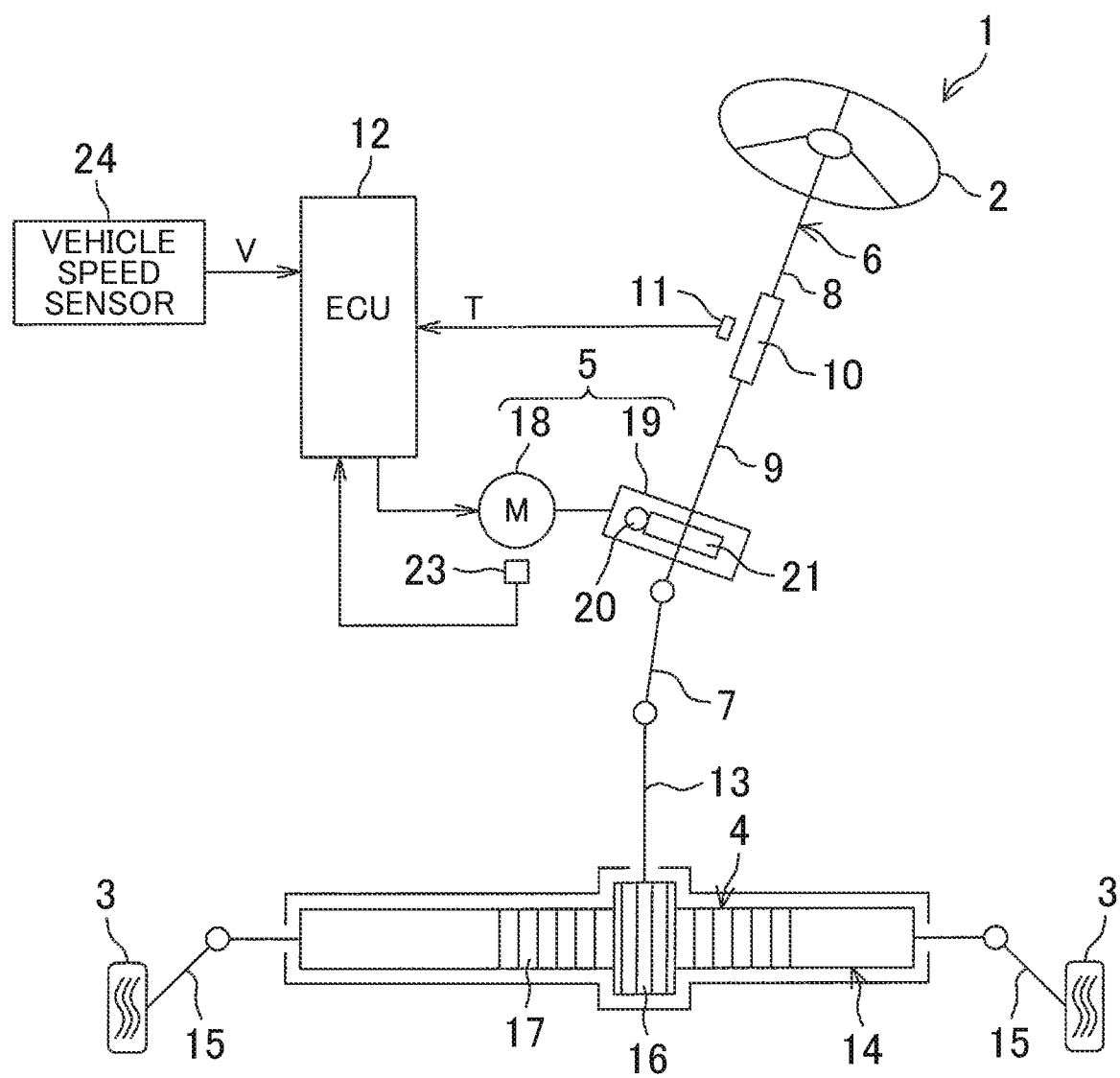
FIG. 1 is a diagram schematically illustrating an electric power steering system that uses a motor control unit according to an embodiment of the invention.

An embodiment of the invention is described below with reference to the drawings. FIG. 1 is a diagram schematically illustrating an electric power steering (EPS) system 1 that uses a motor control unit according to the embodiment of the invention. The electric power steering system 1 includes a steering wheel 2, a steering operation mechanism 4, and a steering assist mechanism 5. The steering wheel 2 is a steering member used to steer a vehicle. The steering operation mechanism 4 steers steered wheels 3 in synchronization with rotation of the steering wheel 2. The steering assist mechanism 5 assists a driver in steering the vehicle. The steering wheel 2 and the steering operation mechanism 4 are mechanically coupled together through a steering shaft 6 and an intermediate shaft 7.

The steering shaft 6 includes an input shaft 8 and an output shaft 9. The input shaft 8 is coupled to the steering wheel 2. The output shaft 9 is coupled to the intermediate shaft 7. The input shaft 8 and the output shaft 9 are coupled together through a torsion bar 10 and are rotatable relative to each other. A torque sensor 11 is located near the torsion bar 10. On the basis of the relative rotational displacement between the input shaft 8 and the output shaft 9, the torque sensor 11 detects a steering torque T being applied to the steering wheel 2. According to the embodiment, for example, the steering torque T detected by the torque sensor 11 has a positive value when applied to steer the vehicle to the right, and has a negative value when applied to steer the vehicle to the left. The steering torque T with a greater absolute value indicates the steering torque T with a greater magnitude.

The steering operation mechanism 4 is a rack and pinion mechanism, and includes a pinion shaft 13 and a rack shaft 14 as a steered shaft. Each of the steered wheels 3 is coupled to a different end of the rack shaft 14 through a tie rod 15 and a knuckle arm (not illustrated). The pinion shaft 13 is coupled to the intermediate shaft 7. The pinion shaft 13 rotates with the rotation of the steering wheel 2. A pinion 16 is coupled to one end (the bottom end in FIG. 1) of the pinion shaft 13.

The rack shaft 14 extends linearly in a lateral direction of the vehicle. A rack 17 is formed in a middle portion of the rack shaft 14 in an axial direction of the rack shaft 14 and meshes with the pinion 16. The pinion 16 and the rack 17 work in conjunction to convert rotary motion of the pinion shaft 13 to an axial movement of the rack shaft 14. The axial movement of the rack shaft 14 steers the steered wheels 3.

When the steering wheel 2 is turned (rotated), the rotation of the steering wheel 2 is transmitted to the pinion shaft 13 through the steering shaft 6 and the intermediate shaft 7. Then, the rotation of the pinion shaft 13 is converted to the axial movement of the rack shaft 14 by the pinion 16 and the rack 17. The axial movement of the rack shaft 14 steers the steered wheels 3. The steering assist mechanism 5 includes an electric motor 18 that outputs torque to assist a driver in steering the vehicle, and a speed-reduction mechanism 19 that transmits the output torque of the electric motor 18 toward the steering operation mechanism 4. According to the embodiment, the electric motor 18 is a three-phase brushless motor. The electric motor 18 is provided with a rotation angle sensor 23, such as a resolver, for detecting a rotation angle of a rotor of the electric motor 18. The speed-reduction mechanism 19 is a worm gear mechanism, and includes a worm shaft 20 and a worm wheel 21 in mesh with the worm shaft 20.

The worm shaft 20 is rotationally driven by the electric motor 18. The worm wheel 21 is coupled to the steering shaft 6 and is rotatable together with the steering shaft 6. The worm wheel 21 is rotationally driven by the worm shaft 20. When the worm shaft 20 is rotationally driven by the electric motor 18, the worm wheel 21 is rotationally driven, so that the steering shaft 6 is rotated. The rotation of the steering shaft 6 is transmitted to the pinion shaft 13 through the intermediate shaft 7. The rotation of the pinion shaft 13 is converted to the axial movement of the rack shaft 14. The axial movement of the rack shaft 14 steers the steered wheels 3. Thus, the electric motor 18 assists a driver in steering the vehicle by rotationally driving the worm shaft 20.

The vehicle is equipped with a vehicle speed sensor 24 for detecting a vehicle speed V. The steering torque T detected by the torque sensor 11, the vehicle speed V detected by the vehicle speed sensor 24, an output signal from the rotation angle sensor 23, and other necessary signals are inputted to an electronic control unit (ECU) 12. On the basis of these input signals, the ECU 12 controls the electric motor 18.

Figure 2:
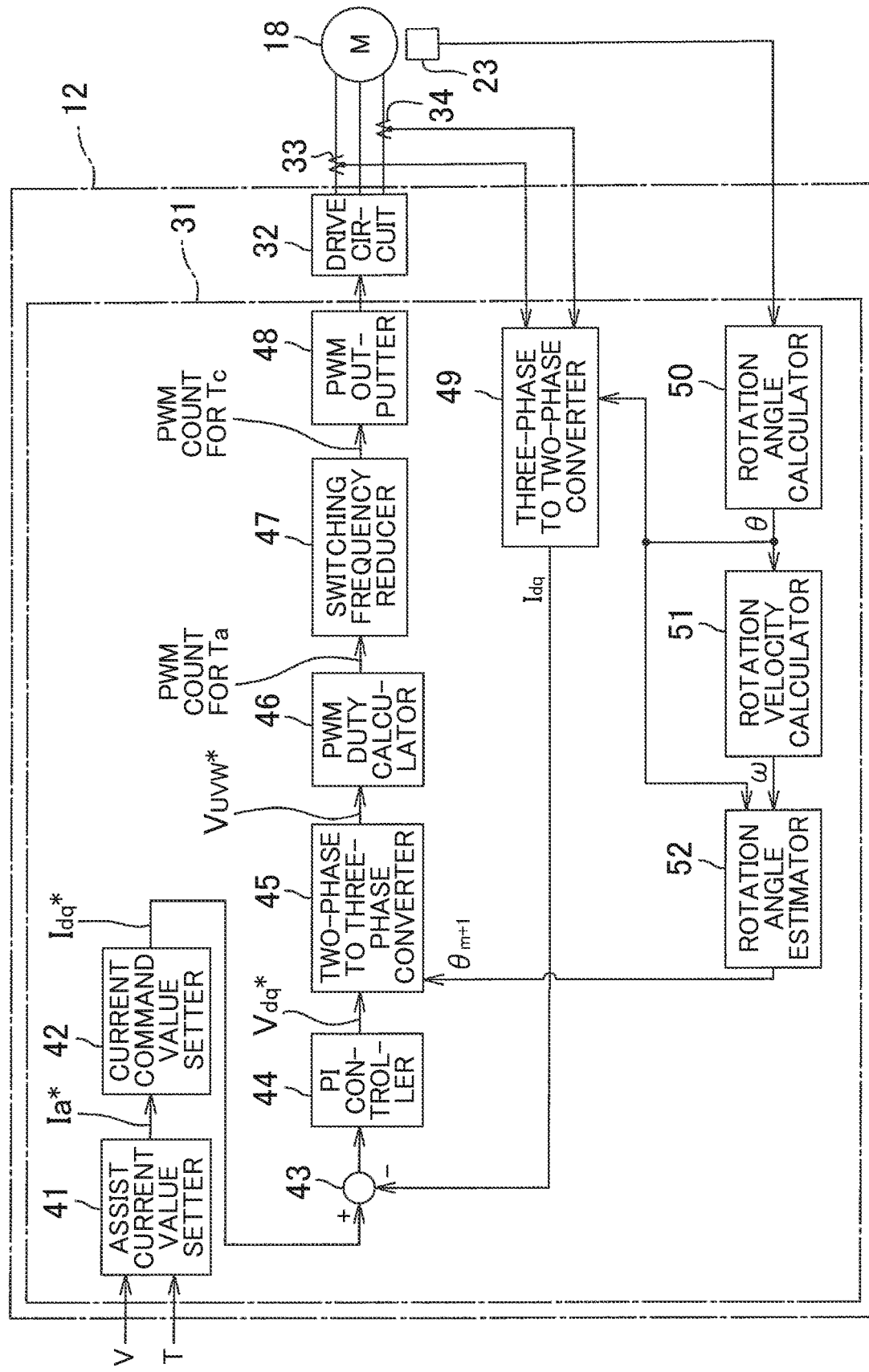
FIG. 2 is a block diagram illustrating the electrical structure of an electronic control unit (ECU)
Figure 3:
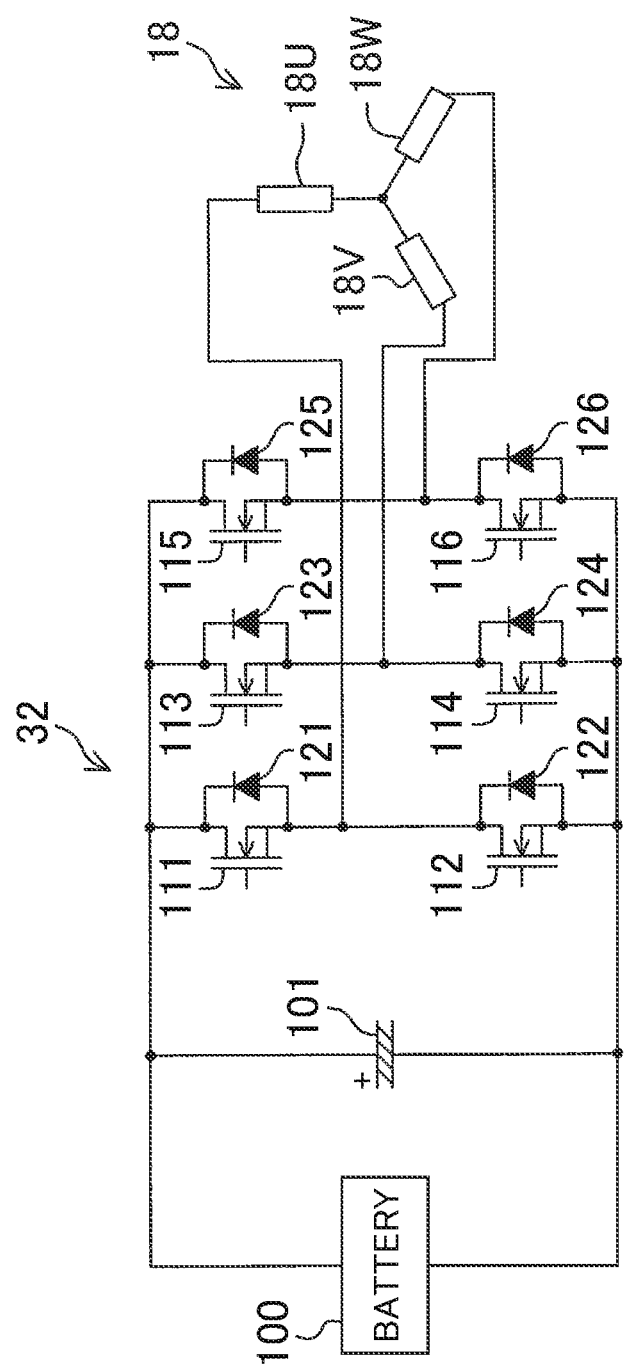
FIG. 3 is an electrical circuit diagram mainly illustrating the structure of a motor drive circuit.

FIG. 2 is a block diagram illustrating the overall electrical structure of the ECU 12. The ECU 12 includes a microcomputer 31 and a motor drive circuit 32 that is controlled by the microcomputer 31 to supply electric power to the electric motor 18. FIG. 3 is an electrical circuit diagram mainly illustrating the structure of the motor drive circuit 32. The electric motor 18 is, for example, a three-phase brushless motor. The electric motor 18 includes a rotor (not illustrated) that serves as a field, and a stator that includes a U-phase stator coil 18U, a V-phase stator coil 18V, and a W-phase stator coil 18W.

The motor drive circuit 32 is a three-phase inverter circuit. The motor drive circuit 32 includes the following: a smoothing capacitor 101 connected in series with a power source (a battery) 100; multiple switching elements 111 to 116; and multiple diodes 121 to 126. The smoothing capacitor 101 is connected between two terminals of the power source 100. According to the embodiment, each of the switching elements 111 to 116 is an n-channel field effect transistor (FET). Examples of the FET include a silicon-based FET (Si-FET), a silicon-carbide-based FET (SiC-FET), and a gallium-nitride-based FET (GaN-FET). In the description below, the switching elements 111 to 116 are sometimes referred to respectively as FETs 111 to 116.

The FET 111 is a U-phase upper FET. The FET 112 is a U-phase lower FET and is connected in series with the upper FET 111. The FET 113 is a V-phase upper FET. The FET 114 is a V-phase lower FET and is connected in series with the upper FET 113. The FET 115 is a W-phase upper FET. The FET 116 is a W-phase lower FET and is connected in series with the upper FET 115. The switching elements 111 to 116 are respectively connected in antiparallel with the diodes 121 to 126.

Drains of the upper FETs 111, 113, and 115 are all connected to a positive terminal of the smoothing capacitor 101. Sources of the upper FETs 111, 113, and 115 are respectively connected to drains of the lower FETs 112, 114, and 116. Sources of the lower FETs 112, 114, and 116 are all connected to a negative terminal of the smoothing capacitor 101. A connection node between the U-phase upper and lower FETs 111 and 112 is connected to the U-phase stator coil 18U of the electric motor 18. A connection node between the V-phase upper and lower FETs 113 and 114 is connected to the V-phase stator coil 18V of the electric motor 18. A connection node between the W-phase upper and lower FETs 115 and 116 is connected to the W-phase stator coil 18W of the electric motor 18. The FETs 111 to 116 are controlled by pulse width modulation (PWM) signals outputted from a later-described PWM outputter 48 (refer to FIG. 2).

Referring back to FIG. 2, three power supply lines that connect the motor drive circuit 32 and the electric motor 18 are provided with two current sensors 33 and 34. The current sensors 33 and 34 detect phase currents flowing through two of the three power supply lines. The microcomputer 31 includes a central processing unit (CPU) and a memory device (a read only memory (ROM), a random-access memory (RAM), a nonvolatile memory, etc.). The microcomputer 31 serves as multiple functional processors by executing predetermined programs. The functional processors include an assist current value setter 41, a current command value setter 42, a current deviation calculator 43, a proportional-integral (PI) controller 44, a two-phase to three-phase converter 45, a PWM duty calculator 46, a switching frequency reducer 47, a PWM outputter 48, a three-phase to two-phase converter 49, a rotation angle calculator 50, a rotation velocity calculator 51, and a rotation angle estimator 52.

Figure 4A:
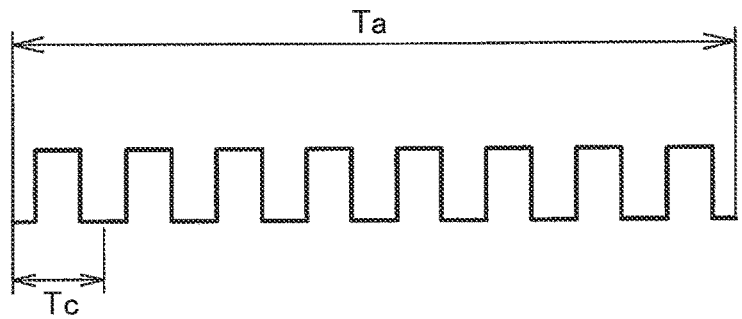
FIG. 4A is a diagram illustrating a relationship between a period Tc of a PWM signal and a current control period Ta.

As illustrated in FIG. 4A, a period Tc of the PWM signal (hereinafter referred to as the PWM period Tc) is less than a current control period Ta. The current control period Ta is the period of a control loop that calculates the motor current. The current control period Ta is determined by considering various factors such as the program size and the computing power of the microcomputer 31. According to the embodiment, at the start of the present current control period Ta, the PWM duty calculator 46 updates PWM counts Cu, Cv, and Cw and outputs the updated PWM counts Cu, Cv, and Cw. According to the embodiment, the PWM period Tc is one-eighth of the current control period Ta. In other words, eight PWM periods Tc are included in one current control period Ta. The first period of the eight PWM periods Tc may be hereinafter referred to as Period 1, and the other subsequent periods may be sequentially referred to as Periods 2, 3, . . . , 7, 8. The period number of the PWM period Tc may be denoted by "i" (i=1, 2, . . . , 7, 8). The frequency (=1/Tc) of the PWM signal is called a carrier frequency.

Figure 4B:
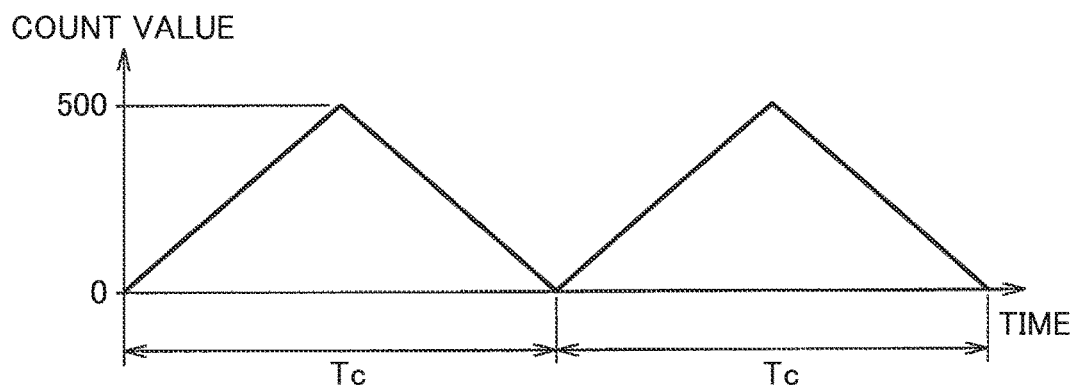
FIG. 4B is a diagram illustrating a carrier waveform.

Next, a method of generating a PWM waveform according to the embodiment is described. According to the embodiment, inside the microcomputer 31, a clock pulse with a predetermined PWM clock frequency is generated by a clock generator (not illustrated), and a counter (not illustrated) counts up or down with each clock pulse. Thus, the count value of the counter varies with time as illustrated in FIG. 4B that has a horizontal axis representing time and a vertical axis representing the count value. It is assumed here that the count value is an unsigned integer. The count value is hereinafter sometimes referred to as a carrier count. The waveform illustrated in FIG. 4B is a carrier waveform. According to the embodiment, the carrier waveform is a triangular wave. One period of the triangular wave is equal to the PWM period Tc. The peak value of the carrier waveform, i.e., the maximum value of the count value determines the frequency of the PWM signal (i.e., the carrier frequency). According to the embodiment, the PWM clock frequency is set to 100 megahertz (MHz), and the frequency of the PWM signal (hereinafter referred to as the PWM frequency) is set to 100 kilohertz (kHz). Thus, the maximum value of a PWM count (hereinafter sometimes referred to as the maximum PWM count) is given as follows: 100,000,000/100,000/2=500. Since the counter counts up and down, the expression "100,000,000/100,000" is divided by two. The minimum value of the PWM count (hereinafter sometimes referred to as the minimum PWM count) is zero.

Figure 4C:
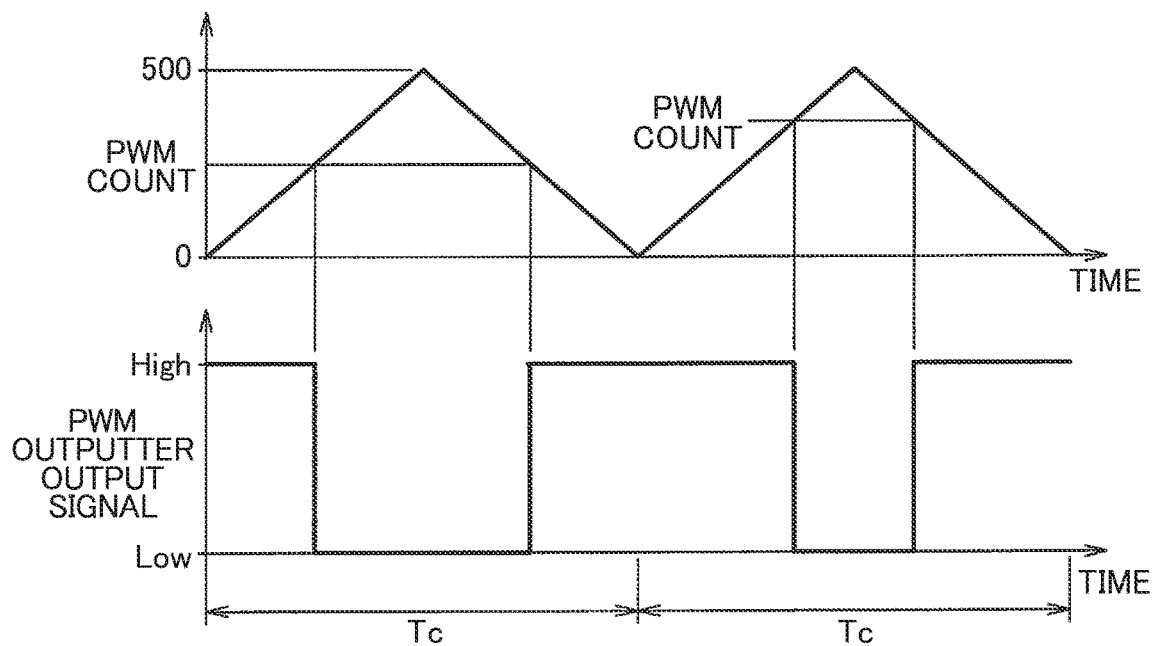
FIG. 4C is a diagram explaining a method of generating the PWM signal.

As illustrated in FIG. 4C, the PWM outputter 48 (refer to FIG. 2) compares the received PWM count with the count value of the counter, and outputs a High signal or a Low signal to the motor drive circuit 32 (refer to FIG. 2) on the basis of the comparison. For example, while the count value of the counter is less than or equal to the PWM count, the PWM outputter 48 outputs the High signal (or the Low signal), and while the count value of the counter is greater than the PWM count, the PWM outputter 48 outputs the Low signal (or the High signal). The High signal and the Low signal form the PWM signal.

When the carrier waveform is a triangular wave, switching timing is symmetric across the midpoint of the carrier period (the PWM period Tc). An on-off state of each of the upper FETs 111, 113, and 115 within the PWM period Tc changes in the following two patterns: a first on-off pattern; and a second on-off pattern. In the first on-off pattern, the on-off state changes as follows with respect to when the carrier count starts being counted: ON->OFF->ON. In the first on-off pattern, as the three-phase voltage command value for a certain phase (outputted from the two-phase to three-phase converter 45 in FIG. 2) increases, the PWM count of the certain phase for the current control period Ta increases. In this case, as the PWM count of a certain phase for the PWM period Tc increases, the ratio of on-time of the upper FET of the certain phase to the PWM period Tc (i.e., duty ratio) increases.

In the second on-off pattern, the on-off state changes as follows with respect to when the carrier count starts being counted: OFF->ON->OFF. In the second on-off pattern, as the three-phase voltage command value for a certain phase increases, the PWM count of the certain phase for the current control period Ta decreases. In this case, as the PWM count of a certain phase for the PWM period Tc increases, the ratio of on-time of the upper FET of the certain phase to the PWM period Tc (i.e., duty ratio) decreases.

An on-off state of the lower FETs 112, 114, and 116 changes oppositely to the on-off state of the upper FETs 111, 113, and 115 respectively. According to the embodiment, the upper FETs 111, 113, and 115 of the respective phases are controlled in the first on-off pattern. Referring back to FIG. 2, the rotation angle calculator 50 calculates, on the basis of the output signal from the rotation angle sensor 23, the rotor rotation angle θ (an electrical angle) of the electric motor 18 at an interval equal to the current control period Ta. The rotor rotation angle θ calculated by the rotation angle calculator 50 is supplied to the three-phase to two-phase converter 49, the rotation velocity calculator 51, and the rotation angle estimator 52. According to the embodiment, the rotor rotation angle θ is obtained (detected) at the midpoint in time of the current control period Ta.

The rotation velocity calculator 51 calculates a rotation velocity (an angular velocity) ω of the rotor of the electric motor 18 by time-differentiating the rotor rotation angle θ calculated by the rotation angle calculator 50. The rotation velocity ω calculated by the rotation velocity calculator 51 is supplied to the rotation angle estimator 52. From the following equation (1), the rotation angle estimator 52 estimates a next rotor rotation angle $\theta_{(m+1)}$ that will be obtained at the midpoint in time of the next current control period Ta, on the basis of a last rotor rotation angle $\theta_{(m-1)}$ that has been obtained at the midpoint in time of the last current control period Ta.

$$\theta_{(m+1)} = \theta_{(m-1)} + \omega \cdot 2Ta \quad (1)$$

Figure 5:
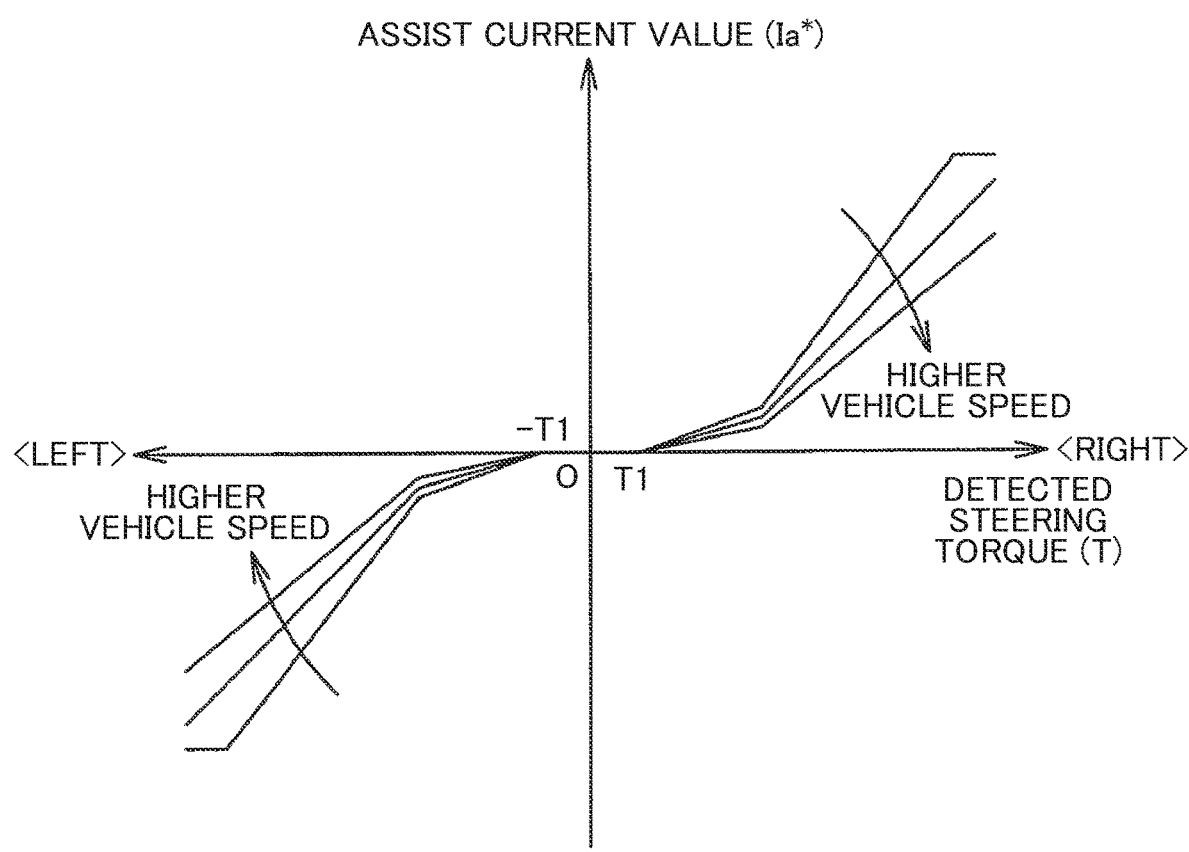
FIG. 5 is a graph illustrating an example of setting an assist current value Ia* for a detected steering torque T.

The next rotor rotation angle $\theta_{(m+1)}$ in the next current control period Ta, estimated by the rotation angle estimator 52, is supplied to the two-phase to three-phase converter 45. The assist current value setter 41 sets an assist current value Ia* at an interval equal to the current control period Ta, on the basis of the steering torque T detected by the torque sensor 11 and the vehicle speed V detected by the vehicle speed sensor 24. FIG. 5 illustrates an example of setting the assist current value Ia* for the detected steering torque T. In the example of FIG. 5, the detected steering torque T has a positive value when applied to steer the vehicle to the right, and has a negative value when applied to steer the vehicle to the left. The assist current value Ia* has a positive value when causing the electric motor 18 to generate a steering assist force for steering the vehicle to the right, and has a negative value when causing the electric motor 18 to generate a steering assist force for steering the vehicle to the left. The assist current value Ia* is positive when the detected steering torque T is positive, and is negative when the detected steering torque T is negative.

When the detected steering torque T falls within a very small value range (i.e., a torque dead zone) of −T1 to T1 (for example, T1=0.4 newton meter (N·m)), the assist current value Ia* is set to zero. In contrast, when the detected steering torque T falls outside the range of −T1 to T1, the assist current value Ia* is set such that the absolute value of the assist current value Ia* increases with an increase in the absolute value of the detected steering torque T. Further, the assist current value Ia* is set such that the absolute value of the assist current value Ia* decreases with an increase in the vehicle speed V detected by the vehicle speed sensor 24. Setting the assist current value Ia* in this way generates greater steering assist force when the vehicle travels at lower speeds, and generates less steering assist force when the vehicle travels at higher speeds.

On the basis of the assist current value Ia* set by the assist current value setter 41, the current command value setter 42 sets current command values indicative of current values that need to be passed in the coordinate axes of a dq coordinate system. Specifically, the current command value setter 42 sets a d-axis current command value $I_d^*$ and a q-axis current command value $I_q^*$ (these command values $I_d^*$ and $I_q^*$ are hereinafter sometimes referred to collectively as a two-phase current command value $I_{dq}^*$). More specifically, the current command value setter 42 sets the q-axis current command value $I_q^*$ to the assist current value Ia* set by the assist current value setter 41 while setting the d-axis current command value $I_d^*$ to zero. The two-phase current command value $I_{dq}^*$ set by the current command value setter 42 is supplied to the current deviation calculator 43.

The three-phase to two-phase converter 49 first calculates, from two phase currents detected by the current sensors 33 and 34, a U-phase current $I_U$, a V-phase current $I_V$, and a W-phase current $I_W$ (these currents $I_U$, $I_V$, and $I_W$ are hereinafter sometimes referred to collectively as a three-phase detected current $I_{UVW}$). Then, the three-phase to two-phase converter 49 performs coordinate transformation from the three-phase detected current $I_{UVW}$ in the UVW coordinate system to a two-phase detected current $I_{dq}$ in the dq coordinate system. The two-phase detected current $I_{dq}$ includes a d-axis detected current $I_d$ and a q-axis detected current $I_q$.

The coordinate transformation is performed by using the rotor rotation angle $\theta$ calculated by the rotation angle calculator 50.

The current deviation calculator 43 calculates a deviation of the d-axis detected current $I_d$ from the d-axis current command value $I_d^*$ and also calculates a deviation of the q-axis detected current $I_q$ from the q-axis current command value $I_q^*$. The current deviations are supplied to the PI controller 44. The PI controller 44 performs PI-calculation on the current deviations calculated by the current deviation calculator 43. Thus, the PI controller 44 generates a two-phase voltage command value $V_{dq}^*$ (specifically, a d-axis voltage command value $V_d^*$ and a q-axis voltage command value $V_q^*$) indicative of a voltage value that needs to be applied to the electric motor 18. The two-phase voltage command value $V_{dq}^*$ is supplied to the two-phase to three-phase converter 45.

The two-phase to three-phase converter 45 performs two-phase to three-phase conversion on the two-phase voltage command value $V_{dq}^*$, calculated by the PI controller 44 in the present current control period Ta, by using the next rotor rotation angle $\theta_{(m+1)}$ for the next current control period Ta, estimated by the rotation angle estimator 52 in the present current control period Ta. Thus, the two-phase to three-phase converter 45 calculates a three-phase voltage command value $V_{UVW}^*$ for the next current control period Ta. The three-phase voltage command value $V_{UVW}^*$ includes a U-phase voltage command value $V_U^*$, a V-phase voltage command value $V_V^*$, and a W-phase voltage command value $V_W^*$. In this way, the three-phase voltage command value $V_{UVW}^*$ for the next current control period Ta is obtained.

The three-phase voltage command value $V_{UVW}^*$ for the next current control period Ta, obtained by the two-phase to three-phase converter 45, is supplied to the PWM duty calculator 46. On the basis of the three-phase voltage command value $V_{UVW}^*$ for the next current control period Ta, the PWM duty calculator 46 generates U-phase, V-phase, and W-phase PWM counts (PWM duty cycles) for the next current control period Ta, and supplies the generated U-phase, V-phase, and W-phase PWM counts to the switching frequency reducer 47.

According to the embodiment, the upper FETs 111, 113, and 115 of the respective phases are controlled in the first on-off pattern. For example, the U-phase PWM count is calculated as follows. The PWM duty calculator 46 calculates a U-phase PWM count Cu for a certain current control period Ta on the basis of the following equation (2), by using the maximum PWM count and the U-phase voltage command value $V_U^*$ for the certain current control period Ta that is obtained by the two-phase to three-phase converter 45.

$$Cu = V_U^* \times (\text{the maximum } PWM \text{ count}/Vb) = V_U^* \times (500/Vb) \quad (2)$$

In the equation (2), Vb represents a power supply voltage of the motor drive circuit 32 (i.e., the output voltage of the power source 100). Using the V-phase voltage command value $V_V^*$ instead of the U-phase voltage command value $V_U^*$ on the right hand side of the equation (2) calculates a V-phase PWM count Cv. Likewise, using the W-phase voltage command value Vw* instead of the U-phase voltage command value $V_U^*$ on the right hand side of the equation (2) calculates a W-phase PWM count Cw.

The switching frequency reducer 47 reduces the number of times the switching elements corresponding to at least one of the three phases, namely, the U-phase, the V-phase, and the W-phase are switched within the current control period Ta, thereby reducing switching loss of the switching elements corresponding to the at least one of the three phases. Reducing switching loss of the switching elements corresponding to at least one phase suppresses heat generated by the motor drive circuit 32.

The switching frequency reducer 47 reduces the number of times of switching within the next current control period Ta by performing processing (switching frequency reduction processing) on the U-phase, V-phase, and W-phase PWM counts Cv, Cv, and Cw for the next current control period Ta, supplied from the PWM duty calculator 46. Thus, U-phase, V-phase, and W-phase PWM counts for each of the PWM periods Tc within the next current control period Ta are obtained. The operation of the switching frequency reducer 47 is described in detail later.

The U-phase, V-phase, and W-phase PWM counts for each of the PWM periods Tc within the next current control period Ta, obtained by the switching frequency reduction processing through the switching frequency reducer 47, are supplied to the PWM outputter 48. The PWM outputter 48 stores, over multiple current control periods, the U-phase, V-phase, and W-phase PWM counts for each of the PWM periods Tc within the current control period Ta, supplied from the switching frequency reducer 47.

On the basis of the U-phase, V-phase, and W-phase PWM counts for each of the PWM periods Tc within the present current control period Ta, supplied from the switching frequency reducer 47 in the last current control period Ta, the PWM outputter 48 generates U-phase, V-phase, and W-phase PWM signals for each of the PWM periods Tc within the present current control period Ta, and supplies the generated U-phase, V-phase, and W-phase PWM signals to the motor drive circuit 32. Specifically, for each of the PWM periods Tc within the present current control period Ta, the PWM outputter 48 generates U-phase, V-phase, and W-phase PWM signals having duty cycles corresponding, respectively, to the U-phase, V-phase, and W-phase PWM counts for each of the PWM periods Tc within the present current control period Ta, and supplies the U-phase, V-phase, and W-phase PWM signals to the motor drive circuit 32.

The six FETs 111 to 116 of the motor drive circuit 32 are controlled by the PWM signals supplied from the PWM outputter 48. Thus, voltages corresponding to the three-phase voltage command value $V_{UVW}*$ for each of the PWM periods Tc are applied to the U-phase, V-phase, and W-phase stator coils 18U, 18V, and 18W of the electric motor 18. The current deviation calculator 43 and the PI controller 44 form a current feedback controller. Through the operation of the current feedback controller, the motor current flowing through the electric motor 18 is controlled to follow the two-phase current command value $I_{dq}*$ set by the current command value setter 42.

The switching frequency reducer 47 is described in detail below. First, a basic concept of how the switching frequency reducer 47 reduces the number of times of switching is described with reference to FIG. 6. As described later, the switching frequency reducer 47 sets the U-phase, V-phase, and W-phase PWM counts Cu, Cv, and Cw (i.e., first PWM counts) for the next current control period Ta, supplied from the PWM duty calculator 46, respectively as U-phase, V-phase, and W-phase PWM counts Cu, Cv, and Cw (i.e., second PWM counts) for each of the PWM periods Tc within the next current control period Ta. After that, in order to reduce the number of times the FETs 111 to 116 of the motor drive circuit 32 are switched, the switching frequency reducer 47 changes at least one of the U-phase, V-phase, and W-phase PWM counts set for each of the PWM periods Tc within the next current control period Ta.

Figure 6:
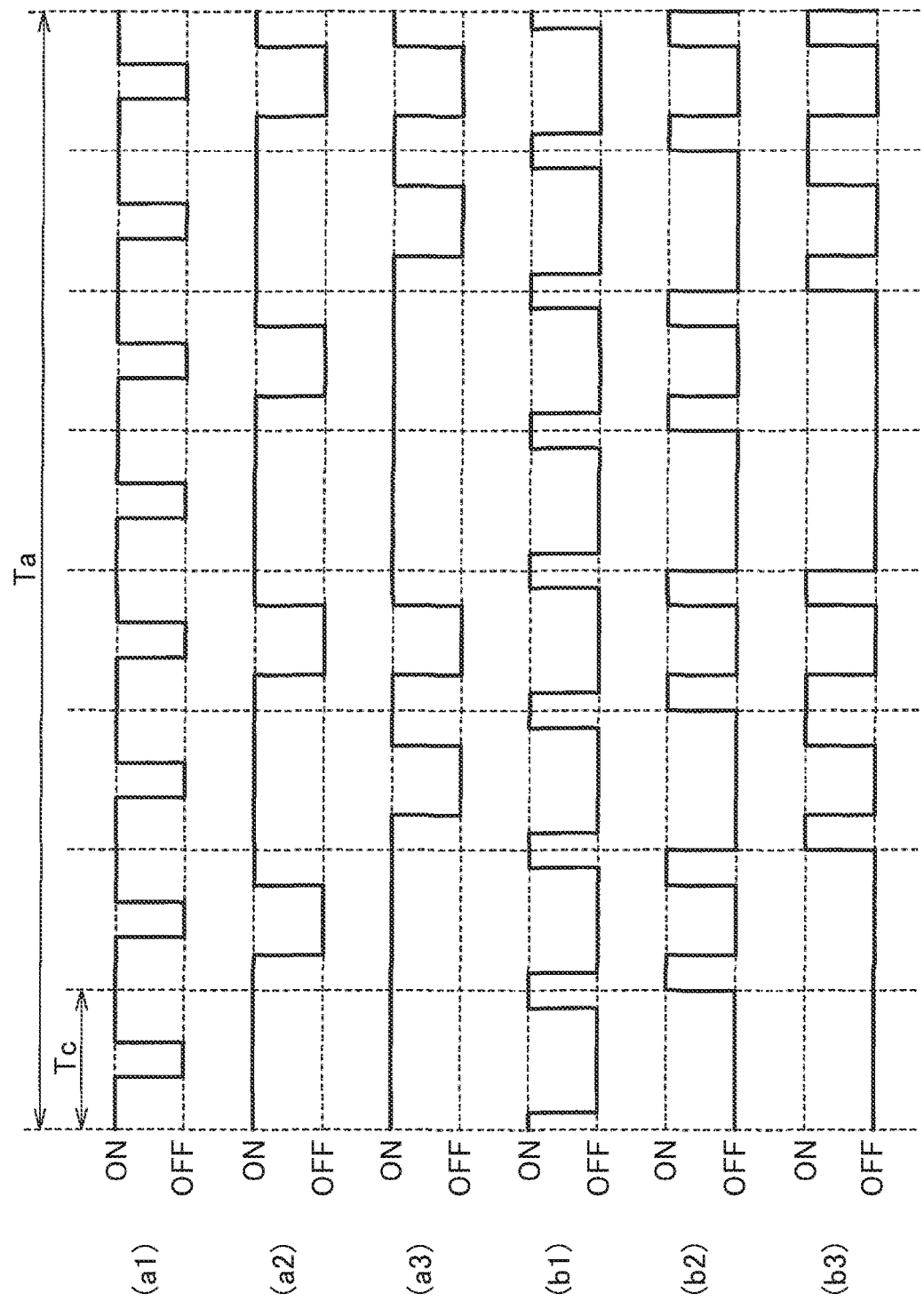
FIG. 6 is a diagram explaining a basic concept of how a switching frequency reducer reduces the number of times of switching.
Figure 7A:
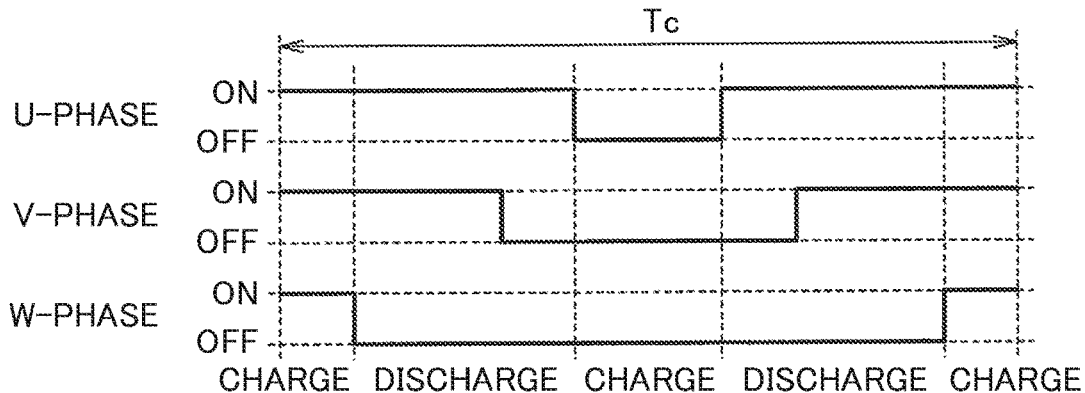
FIGS. 7A-7D are diagrams explaining that if one phase has a duty ratio of 100% while another phase has a duty ratio of 0% in a certain PWM period, a smoothing capacitor remains in discharge mode throughout the certain PWM period.
Figure 7B:
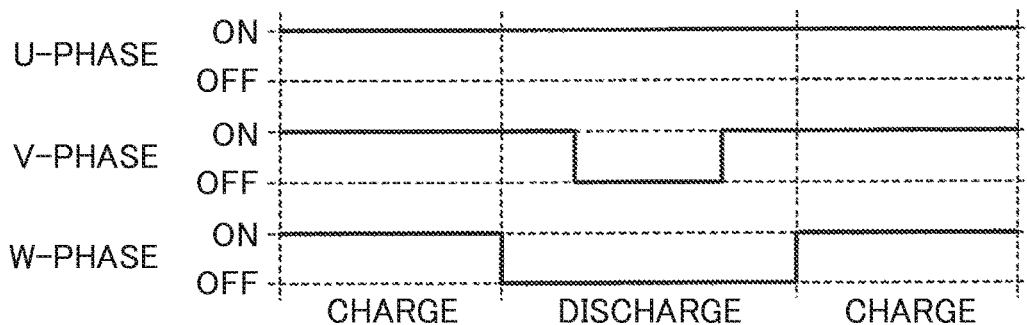
Figure 7C:
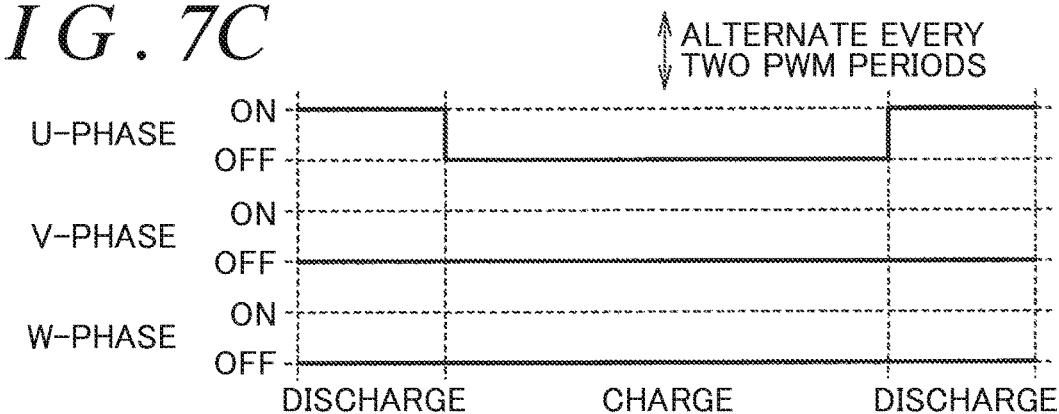
Figure 7D:
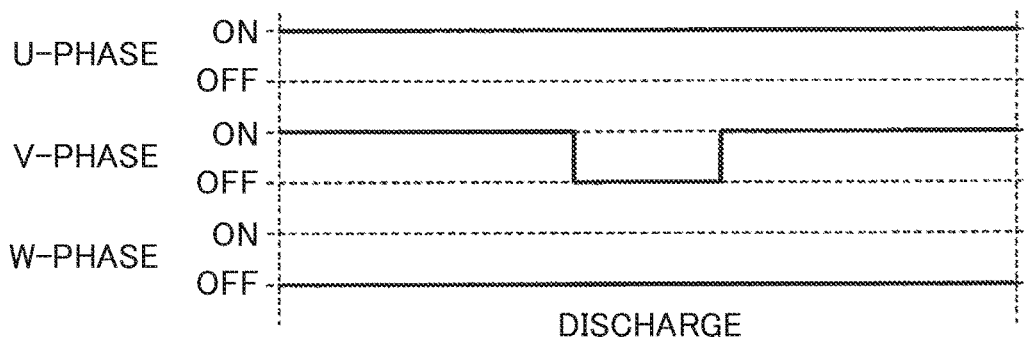

Illustrated in (a1) of FIG. 6 is the on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (a1) of FIG. 6, the ratio of on-time of the upper FET 111 to the PWM period Tc (i.e., duty ratio) is greater than 50%.

Two examples are described below that change the PWM count set for each of the PWM periods Tc within the current control period Ta in such a manner as to satisfy a following first condition: the duty ratios (the PWM counts) for half of all the PWM periods Tc within the current control period Ta are set to 100% while the total of the duty ratios for the PWM periods Tc within the current control period Ta is kept unchanged. Illustrated in (a2) of FIG. 6 is a first example that satisfies the first condition by changing the duty ratios for the odd-numbered PWM periods Tc to 100% while reducing the duty ratios for the even-numbered PWM periods Tc. As can be seen from (a2) of FIG. 6, the first example reduces the number of times the upper FET 111 is switched within the current control period Ta.

Illustrated in (a3) of FIG. 6 is a second example that satisfies the first condition by changing the duty ratio for each of the PWM periods Tc within the current control period Ta such that the duty ratio alternates between 100% and a value other than 100% every two PWM periods Tc. Similar to the first example, the second example also reduces the number of times the upper FET 111 is switched within the current control period Ta. Illustrated in (b1) of FIG. 6 is the on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (b1) of FIG. 6, the ratio of on-time of the upper FET 111 to the PWM period Tc (i.e., duty ratio) is less than 50%.

Two examples are described below that change the U-phase PWM count Cu set for each of the PWM periods Tc within the current control period Ta in such a manner as to satisfy a following second condition: the duty ratios (the PWM counts) for half of all the PWM periods Tc within the current control period Ta are set to 0% while the total of the duty ratios for the PWM periods Tc within the current control period Ta is kept unchanged. Illustrated in (b2) of FIG. 6 is a first example that satisfies the second condition by changing the duty ratios for the odd-numbered PWM periods Tc to 0% while increasing the duty ratios for the even-numbered PWM periods Tc. As can be seen from (b2) of FIG. 6, the first example does not reduce the number of times the upper FET 111 is switched within the current control period Ta.

Illustrated in (b3) of FIG. 6 is a second example that satisfies the second condition by changing the duty ratio for each of the PWM periods Tc within the current control period Ta such that the duty ratio alternates between 0% and a value other than 0% every two PWM periods Tc. As can be seen from (b3) of FIG. 6, the second example reduces the number of times the upper FET 111 is switched within the current control period Ta. In conclusion, when the carrier waveform is a triangular wave, and the upper FETs 111, 113, and 115 of the respective phases are controlled in the first on-off pattern, it is possible to reduce the total number of times the FETs of the motor drive circuit 32 are switched within the current control period Ta by changing the PWM counts of at least one of the phases for the PWM periods within the current control period Ta in such a manner as to satisfy one of conditions A1 and B1 described below.

The condition A1 is that the duty ratio for at least one of the PWM periods Tc within the current control period Ta is set to 100% while the total of the duty ratios for the PWM periods Tc within the current control period Ta is kept unchanged. The condition B1 is that the duty ratios for two or more consecutive ones of the PWM periods Tc within the current control period Ta are set to 0% while the total of the duty ratios for the PWM periods Tc within the current control period Ta is kept unchanged. It is noted that if one phase has a duty ratio of 100% while another phase has a duty ratio of 0% in a certain PWM period Tc, the smoothing capacitor 101 (refer to FIG. 3) remains in discharge mode throughout the certain PWM period Tc. In this case, the smoothing capacitor 101 is not charged and thus may become non-functional. For this reason, the PWM counts are preferably changed such that a situation does not occurs in any of the PWM periods Tc where one phase has a duty ratio of 100% while another phase has a duty ratio of 0%.

This is described in more detail with reference to FIG. 7. Illustrated in (a) of FIG. 7 are on-off states of the U-phase, V-phase, and W-phase upper FETs 111, 113, and 115 in accordance with their respective PWM counts set for a certain PWM period Tc, and also illustrates charge and discharge modes of the smoothing capacitor 101. The smoothing capacitor 101 operates in charge mode, when all the upper FETs 111, 113, and 115 of the respective phases are ON, or when all the upper FETs 111, 113, and 115 are OFF. In contrast, the smoothing capacitor 101 operates in discharge mode, when one of the upper FETs 111, 113, and 115 is ON while another of the upper FETs 111, 113, and 115 is OFF. In the PWM period Tc illustrated in (a) of FIG. 7, the smoothing capacitor 101 is alternately charged and discharged. Illustrated in (b) and (c) of FIG. 7 are examples that change the PWM counts corresponding to (a) of FIG. 7 in such a manner as to avoid a situation where one phase has a duty ratio of 100% while another phase has a duty ratio of 0% in the same PWM period Tc. The upper FETs 111, 113, and 115 of the respective phases alternate between the on-off pattern illustrated in (b) of FIG. 7 and the on-off pattern illustrated in (c) of FIG. 7, every predetermined number of PWM periods Tc, for example, every two PWM periods Tc.

In the example illustrated in (b) of FIG. 7, the duty cycle for the U-phase upper FET 111 is set to 100% while the duty cycles for the V-phase and W-phase upper FETs 113 and 115 are both set greater than 0% and less than 100%. In the example illustrated in (c) of FIG. 7, the duty cycles for the V-phase and W-phase upper FETs 113 and 115 are both set to 0% while the duty cycle for the U-phase upper FET 111 is set greater than 0% and less than 100%. In the PWM period Tc where the on-off pattern illustrated in either (b) or (c) of FIG. 7 is used, the smoothing capacitor 101 is alternately charged and discharged.

Illustrated in (d) of FIG. 7 is an example of a situation where one phase has a duty ratio of 100% while another phase has a duty ratio of 0% in the same PWM period Tc. When one phase has a duty ratio of 100% while another phase has a duty ratio of 0% in a certain PWM period Tc, as illustrated in (d) of FIG. 7, the upper FET of one phase remains ON while the upper FET of another phase remains OFF throughout the certain PWM period Tc. As a result, the smoothing capacitor 101 remains discharged throughout the certain PWM period Tc.

Figure 8:
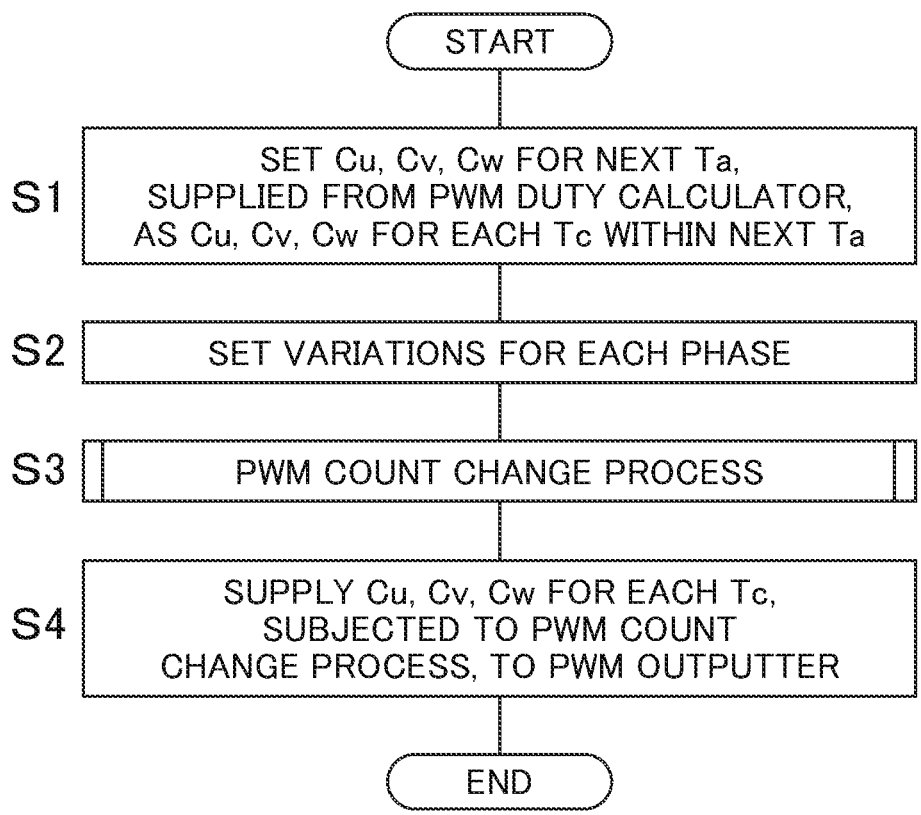
FIG. 8 is a flowchart illustrating an example of the operation of the switching frequency reducer.

FIG. 8 is a flowchart illustrating an example of the operation of the switching frequency reducer 47. The switching frequency reducer 47 (refer to FIG. 2) first sets U-phase, V-phase, and W-phase PWM counts Cu, Cv, and Cw (i.e., first PWM counts) for the next current control period Ta, supplied from the PWM duty calculator 46, respectively as U-phase, V-phase, and W-phase PWM counts Cu, Cv, and Cw (i.e., second PWM counts) for each of the PWM periods Tc within the next current control period Ta (step S1).

FIG. 9A illustrates examples of the U-phase, V-phase, and W-phase PWM counts Cu, Cv, and Cw set in step S1 for each of the PWM periods Tc within the current control period Ta. Then, the switching frequency reducer 47 sets variations for the U-phase, V-phase, and W-phase to reduce the number of times of switching (step S2). Specifically, the switching frequency reducer 47 sets the variations for the U-phase, V-phase, and W-phase to change the respective PWM counts such that one of the conditions A1 and B1 is satisfied in each phase.

Adding, to the PWM count of a certain phase set for each of the PWM periods Tc within the current control period Ta, variations based on, for example, a first variation pattern illustrated in FIG. 9B or a second variation pattern illustrated in FIG. 9B makes it possible to change the PWM count of the certain phase without changing the total of the PWM counts of the certain phase within the current control period Ta. In FIG. 9B, "x" represents a variation definition value that defines the absolute value of the variations. According to the embodiment, the second variation pattern is used to change the PWM count of each phase (the U-phase, the W-phase, and the W-phase) to satisfy the following condition included in the condition B1: the duty ratios for two or more consecutive ones of the PWM periods Tc within the current control period Ta are set to 0%.

How the switching frequency reducer 47 calculates the variation definition value x individually for each phase is described below. First, the switching frequency reducer 47 classifies each of the U-phase, V-phase, and W-phase into either a high-count phase or a low-count phase. When the PWM count of a certain phase that is set in step S1 for each of the PWM periods Tc (in this embodiment, identical to the PWM count set for the current control period Ta, supplied from the PWM duty calculator 46) is greater than or equal to one-half of the maximum PWM count, the certain phase is classified as the high-count phase. In contrast, when the PWM count of the certain phase is less than one-half of the maximum PWM count, the certain phase is classified as the low-count phase. According to the embodiment, since the maximum PWM count is 500, one-half of the maximum PWM count is 250.

Alternatively, when the PWM count of a certain phase that is set in step S1 for each of the PWM periods Tc is greater than one-half of the maximum PWM count, the certain phase may be classified as the high-count phase, and when the PWM count of the certain phase is less than or equal to one-half of the maximum PWM count, the certain phase may be classified as the low-count phase. Next, the switching frequency reducer 47 calculates a first difference between the PWM count of the high-count phase set for each of the PWM periods Tc and the maximum PWM count by subtracting the PWM count of the high-count phase from the maximum PWM count, and sets the first difference as the variation definition value x for the high-count phase. Further, the switching frequency reducer 47 calculates a second difference between the PWM count of the low-count phase set for each of the PWM periods Tc and the minimum PWM count (0) by subtracting the minimum PWM count from the PWM count of the low-count phase, and sets the second difference as the variation definition value x for the low-count phase.

In the example illustrated in FIG. 9A, the U-phase PWM count Cu is 400, i.e., greater than or equal to one-half of the maximum PWM count. Therefore, the variation definition value x for the U-phase is 100 (=500–400). The V-phase PWM count Cv is 300, i.e., greater than or equal to one-half of the maximum PWM count. Therefore, the variation definition value x for the V-phase is 200 (=500–300). The W-phase PWM count Cw is 100, i.e., less than one-half of the maximum PWM count. Therefore, the variation definition value x for the W-phase is 100 (=100–0).

The switching frequency reducer 47 sets the variations of the respective phases for each of the PWM periods Tc on the basis of the calculated variation definition values x and the variation patterns of the respective phases (in this example, the second variation pattern is applied to each phase). FIG. 9C illustrates the variations of the U-phase, V-phase, and W-phase for each of the PWM periods Tc that are set on the basis of the PWM counts of the respective phases for each of the PWM periods Tc illustrated in FIG. 9A.

After setting the variations, the switching frequency reducer 47 performs a PWM count change process to change the PWM count of each phase (step S3). Specifically, the switching frequency reducer 47 changes the PWM count of each phase set in step S1 according to the variations of the corresponding phase. More specifically, the switching frequency reducer 47 adds, to the PWM count of each phase set in step S1 for each of the PWM periods Tc, the variations of the corresponding phase, thereby changing the PWM count of each phase set for each of the PWM periods Tc. Then, the switching frequency reducer 47 finishes the PWM count change process.

Next, the switching frequency reducer 47 supplies the U-phase, V-phase, and W-phase PWM counts Cu, Cv, and Cw for each of the PWM periods Tc that have been subjected to the PWM count change process through step S3, to the PWM outputter 48 respectively as final U-phase, V-phase, and W-phase PWM counts Cu, Cv, and Cw for each of the PWM periods Tc within the next current control period Ta (step S4). After that, the switching frequency reducer 47 finishes the switching frequency reduction processing in the present current control period Ta.

When the PWM counts of the respective phases are set in step S1 for each of the PWM periods Tc as illustrated in FIG. 9A, and the variations of the respective phases are set as illustrated in FIG. 9C, the final U-phase, V-phase, and W-phase PWM counts Cu, Cv, and Cw for each of the PWM periods Tc are set as illustrated in FIG. 9D. As illustrated in FIG. 9D, for the PWM period Tc with the period number i=1, 2, 5, or 6, each of the U-phase PWM count Cu and the V-phase PWM count Cv is changed to 500. Thus, for the PWM period Tc with the period number i=1, 2, 5, and 6, the duty ratio of each of the U-phase and the V-phase is changed to 100%. On the other hand, for the PWM period Tc with the period number i=3, 4, 7, and 8, the W-phase PWM count Cw is changed to zero. Thus, for the PWM period Tc with the period number i=3, 4, 7, and 8, the duty ratio of the W-phase is changed to 0%. However, the total of the PWM counts for the PWM periods Tc within the current control period Ta remains unchanged in each phase between FIG. 9A and FIG. 9D.

In summary, according to the example illustrated in FIGS. 9A to 9D, the U-phase and V-phase PWM counts Cu and Cv for each of the PWM periods Tc within the current control period Ta are changed such that the condition A1 is satisfied. On the other hand, the W-phase PWM count Cw for each of the PWM periods Tc within the current control period Ta is changed such that the condition B1 is satisfied. Thus, in this example, the number of times each of the FETs 111 to 116 of the respective phases of the motor drive circuit 32 is switched is reduced.

As can be seen from FIG. 9D, a situation does not occur in any of the PWM periods Tc where one phase has a PWM count of 500 while another phase has a PWM count of zero. Thus, the smoothing capacitor 101 is charged and discharged in each of the PWM periods Tc. This is achieved when the variation pattern used to change the PWM counts of one phase for some of the PWM periods Tc to the maximum PWM count is the same as the variation pattern used to change the PWM counts of another phase for some of the PWM periods Tc to the minimum PWM count.

The embodiment described above may be modified in various ways. Some examples of the modifications are described below. According to the embodiment, the carrier waveform is a triangular wave, and the upper FETs 111, 113, and 115 of the respective phases are controlled in the first on-off pattern. Alternatively, when the carrier waveform is a triangular wave, the upper FETs 111, 113, and 115 of the respective phases may be controlled in the second on-off pattern.

An example of how to calculate a U-phase PWM count Cu for the current control period Ta in this case is described below. The PWM duty calculator 46 calculates the U-phase PWM count Cu for a certain current control period Ta on the basis of the following equation (3), by using the maximum PWM count and the U-phase voltage command value $V_U^*$ for the certain current control period Ta that is obtained by the two-phase to three-phase converter 45.

$$Cu = \text{the maximum } PWM \text{ count} - \{V_U^* \times (\text{the maximum } PWM \text{ count}/Vb)\} = 500 - \{V_U^* \times (500/Vb)\} \quad (3)$$

In the equation (3), Vb represents the power supply voltage of the motor drive circuit 32 (i.e., the output voltage of the power source 100). Using the V-phase voltage command value $V_V^*$ instead of the U-phase voltage command value $V_U^*$ on the right hand side of the equation (3) calculates a V-phase PWM count Cv. Likewise, using the W-phase voltage command value Vw* instead of the U-phase voltage command value $V_U^*$ on the right hand side of the equation (3) calculates a W-phase PWM count Cw.

Figure 10:
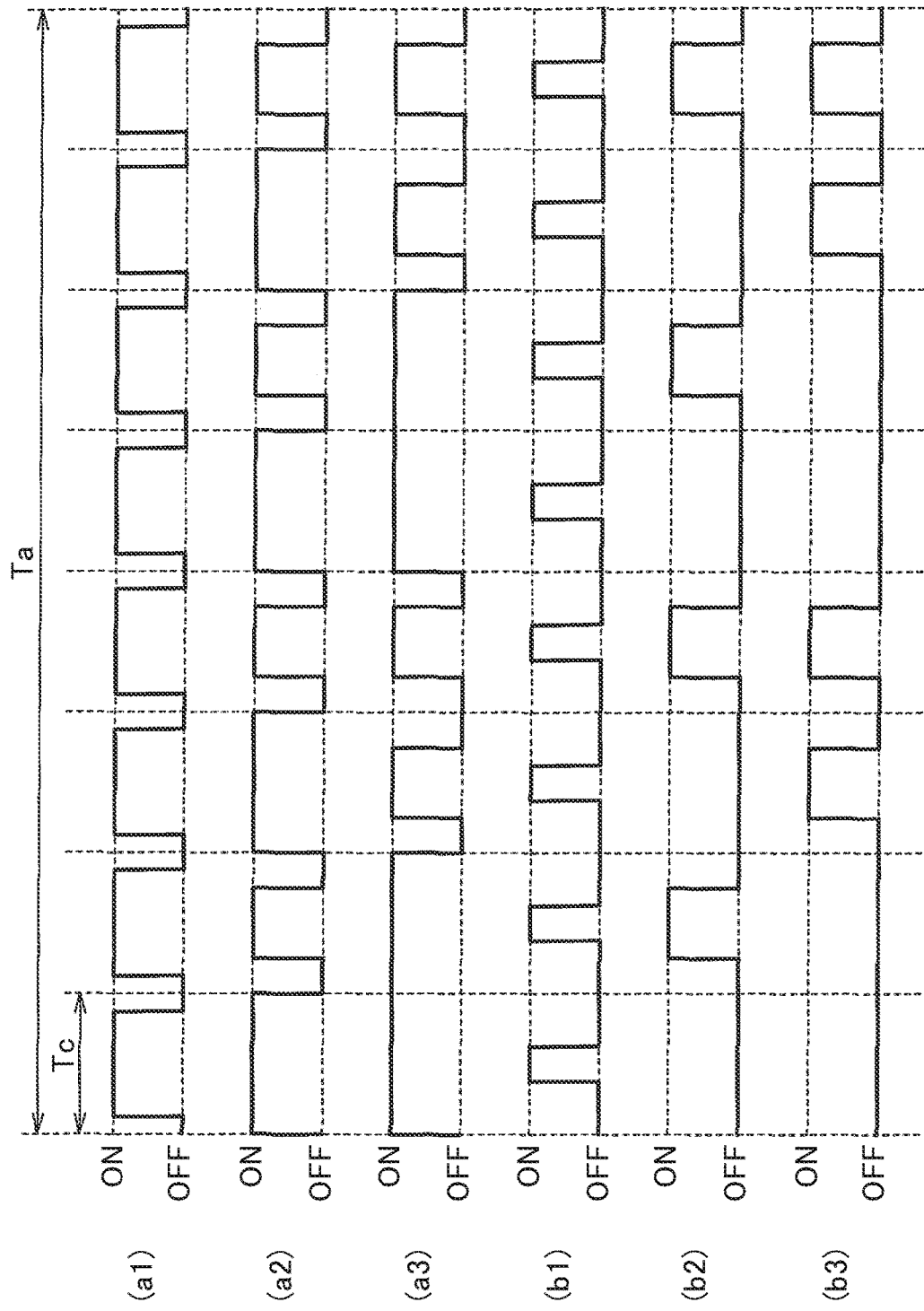
FIG. 10 is a diagram explaining a basic concept of how the switching frequency reducer reduces the number of times of switching.

The switching frequency reducer 47 operates as described below, when the carrier waveform is a triangular wave, and the upper FETs 111, 113, and 115 of the respective phases are controlled in the second on-off pattern. A basic concept of how the switching frequency reducer 47 reduces the number of times of switching is described with reference to FIG. 10. Illustrated in (a1) of FIG. 10 is an on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (a1) of FIG. 10, the ratio of on-time of the upper FET 111 to the PWM period Tc (i.e., duty ratio) is greater than 50%.

Two examples are described below that change the U-phase PWM count Cu set for each of the PWM periods Tc within the current control period Ta in such a manner as to satisfy a following first condition: the duty ratios (the PWM counts) for half of all the PWM periods Tc within the current control period Ta are set to 100% while the total of the duty ratios for the PWM periods Tc within the current control period Ta is kept unchanged. Illustrated in (a2) of FIG. 10 is a first example that satisfies the first condition by changing the duty ratios for the odd-numbered PWM periods Tc to 100% while reducing the duty ratios for the even-numbered PWM periods Tc. As can be seen from (a2) of FIG. 10, the first example does not reduce the number of times the upper FET 111 is switched within the current control period Ta.

Illustrated in (a3) of FIG. 10 is a second example that satisfies the first condition by changing the duty ratio for each of the PWM periods Tc within the current control period Ta such that the duty ratio alternates between 100% and a value other than 100% every two PWM periods Tc. As can be seen from (a3) of FIG. 10, the second example reduces the number of times the upper FET 111 is switched within the current control period Ta. Illustrated in (b1) of FIG. 10 is an on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (b1) of FIG. 10, the ratio of on-time of the upper FET 111 to the PWM period Tc (i.e., duty ratio) is less than 50%.

Two examples are described below that change the U-phase PWM count Cu set for each of the PWM periods Tc within the current control period Ta in such a manner as to satisfy a following second condition: the duty ratios (the PWM counts) for half of all the PWM periods Tc within the current control period Ta are set to 0% while the total of the duty ratios for the PWM periods Tc within the current control period Ta is kept unchanged. Illustrated in (b2) of FIG. 10 is a first example that satisfies the second condition by changing the duty ratios for the odd-numbered PWM periods Tc to 0% while increasing the duty ratios for the even-numbered PWM periods Tc. As can be seen from (b2) of FIG. 10, the first example reduces the number of times the upper FET 111 is switched within the current control period Ta.

Illustrated in (b3) of FIG. 10 is a second example that satisfies the second condition by changing the duty ratio for each of the PWM periods Tc within the current control period Ta such that the duty ratio alternates between 0% and a value other than 0% every two PWM periods Tc. Similar to the first example, the second example also reduces the number of times the upper FET 111 is switched within the current control period Ta. In conclusion, when the carrier waveform is a triangular wave, and the upper FETs 111, 113, and 115 of the respective phases are controlled in the second on-off pattern, it is possible to reduce the total number of times the FETs of the motor drive circuit 32 are switched within the current control period Ta by changing the PWM counts of at least one of the phases for the PWM periods within the current control period Ta in such a manner as to satisfy one of conditions A2 and B2 described below.

The condition A2 is that the duty ratio for each of two or more consecutive ones of the PWM periods Tc within the current control period Ta is set to 100% while the total of the duty ratios for the PWM periods Tc within the current control period Ta is kept unchanged. The condition B2 is that the duty ratio for at least one of the PWM periods Tc within the current control period Ta is set to 0% while the total of the duty ratios for the PWM periods Tc within the current control period Ta is kept unchanged. Further, in order to avoid a situation where the smoothing capacitor 101 (refer to FIG. 3) remains in discharge mode throughout a certain PWM period Tc, it is preferable that the PWM counts be changed such that a situation does not occur in any of the PWM periods Tc where one phase has a duty ratio of 100% while another phase has a duty ratio of 0%.

When the carrier waveform is a triangular wave, and the upper FET of each phase is controlled in the second on-off pattern, the switching frequency reducer 47 operates in the same manner as when the carrier waveform is a triangular wave, and the upper FET of each phase is controlled in the first on-off pattern (refer to FIG. 8). However, in this case, the duty ratio for the PWM period Tc that has the PWM count changed to the maximum PWM count (500) becomes 0%, and the duty ratio for the PWM period Tc that has the PWM count changed to the minimum PWM count (0) becomes 100%.

Figure 11A:
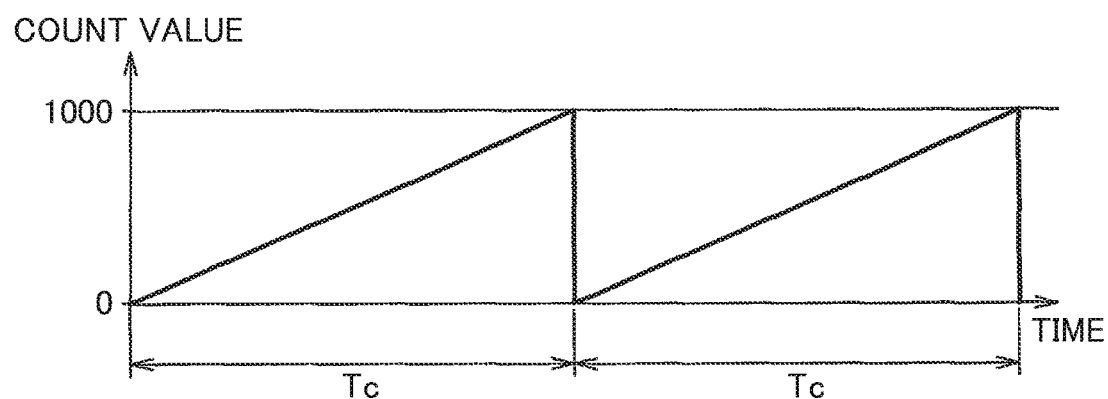
FIG. 11A is a diagram illustrating a carrier waveform.

The carrier waveform need not be a triangular wave but may have other shapes such as a sawtooth wave. When the carrier waveform is a sawtooth wave, the following operation is repeated inside the microcomputer 31: a clock pulse with a predetermined PWM clock frequency is generated by a clock generator (not illustrated), and a counter (not illustrated) counts up with each clock pulse and gets reset each time the count value reaches a predetermined maximum value. Thus, the count value of the counter varies with time as illustrated in FIG. 11A that has a horizontal axis representing time and a vertical axis representing the count value. One period of the sawtooth wave is equal to the PWM period Tc. The peak value of the carrier waveform, i.e., the maximum value of the count value determines the frequency of the PWM signal (i.e., the carrier frequency). According to the embodiment, the PWM clock frequency is 100 megahertz (MHz), and the frequency of the PWM signal (hereinafter referred to as the PWM frequency) is 100 kilohertz (kHz). Thus, the maximum value of the PWM count (hereinafter sometimes referred to as the maximum PWM count) is given as follows: 100,000,000/100,000=1,000. The minimum value of the PWM count (hereinafter sometimes referred to as the minimum PWM count) is zero.

Figure 11B:
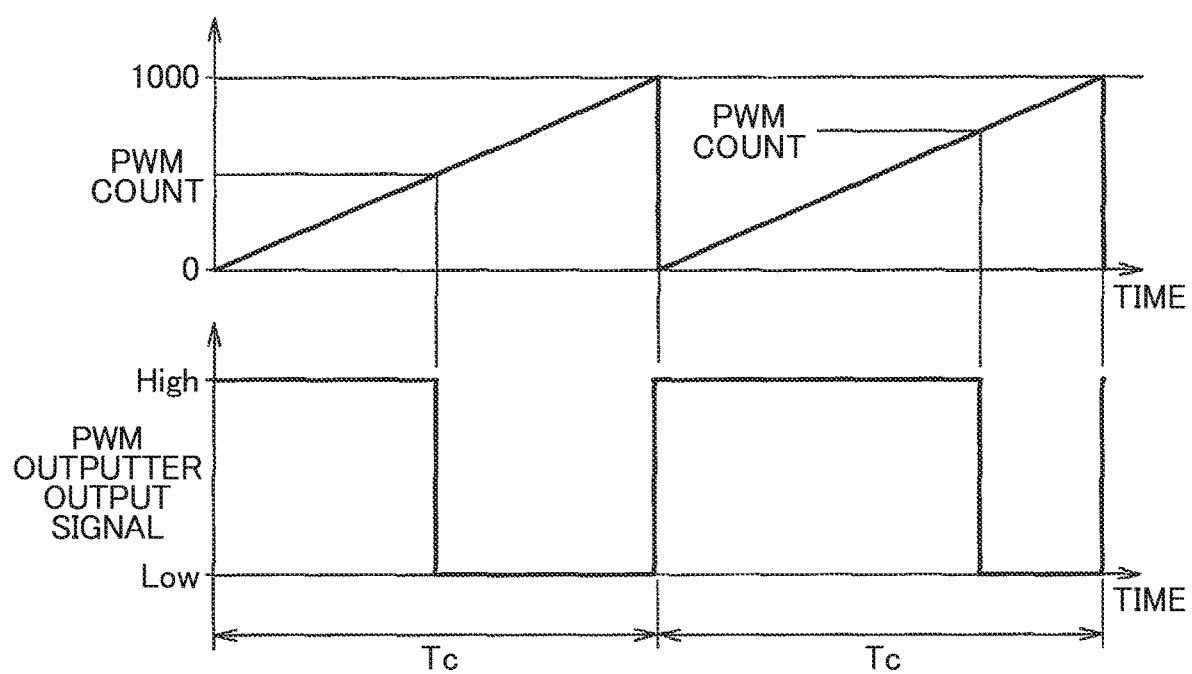
FIG. 11B is a diagram explaining a method of generating a PWM signal.

As illustrated in FIG. 11B, the PWM outputter 48 (refer to FIG. 2) compares the supplied PWM count with the count value of the counter, and outputs a High signal or a Low signal to the motor drive circuit 32 (refer to FIG. 2) on the basis of the comparison. For example, while the count value of the counter is less than or equal to the PWM count, the PWM outputter 48 outputs the High signal (or the Low signal), and while the count value of the counter is greater than the PWM count, the PWM outputter 48 outputs the Low signal (or the High signal). The High signal and the Low signal form the PWM signal.

When the carrier waveform is a sawtooth wave, an on-off state of each FET changes twice during one period of the carrier waveform. The first change occurs when the carrier count starts being counted, and then the second change occurs before the carrier count gets reset. The on-off state of each of the upper FETs 111, 113, and 115 within the PWM period Tc changes in the following two patterns: a first on-off pattern; and a second on-off pattern. In the first on-off pattern, the on-off state changes from on-state to off-state from the time when the carrier count starts being counted. In the first on-off pattern, as the three-phase voltage command value for a certain phase increases, the PWM count of the certain phase for the current control period Ta increases. In this case, as the PWM count of a certain phase for the PWM period Tc increases, the ratio of on-time of the upper FET of the certain phase to the PWM period Tc (i.e., duty ratio) increases.

In the second on-off pattern, the on-off state changes from off-state to on-state from the time when the carrier count starts being counted. In the second on-off pattern, as the three-phase voltage command value for a certain phase increases, the PWM count of the certain phase for the current control period Ta decreases. In this case, as the PWM count of a certain phase for the PWM period Tc increases, the ratio of on-time of the upper FET of the certain phase to the PWM period Tc (i.e., duty ratio) decreases.

An on-off state of the lower FETs 112, 114, and 116 changes oppositely to the on-off state of the upper FETs 111, 113, and 115 respectively. The following describes a case where the upper FETs 111, 113, and 115 of the respective phases are controlled in the first on-off pattern. An example of how to calculate a U-phase PWM count Cu for the current control period Ta in this case is described below. The PWM duty calculator 46 calculates the U-phase PWM count Cu for a certain current control period Ta on the basis of the following equation (4), by using the maximum PWM count and the U-phase voltage command value $V_U^*$ for the certain current control period Ta that is obtained by the two-phase to three-phase converter 45.

$$Cu = V_U^* \times (\text{the maximum } PWM \text{ count}/Vb) = V_U^* \times (1{,}000/Vb) \quad (4)$$

In the equation (4), Vb represents the power supply voltage of the motor drive circuit 32 (i.e., the output voltage of the power source 100). Using the V-phase voltage command value $V_V^*$ instead of the U-phase voltage command value $V_U^*$ on the right hand side of the equation (4) calculates a V-phase PWM count Cv. Likewise, using the W-phase voltage command value Vw* instead of the U-phase voltage command value $V_U^*$ on the right hand side of the equation (4) calculates a W-phase PWM count Cw.

The switching frequency reducer 47 operates as described below, when the carrier waveform is a sawtooth wave, and the upper FETs 111, 113, and 115 of the respective phases are controlled in the first on-off pattern. A basic concept of how the switching frequency reducer 47 reduces the number of times of switching is described with reference to FIG. 12. Illustrated in (a1) of FIG. 12 is an on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (a1) of FIG. 12, the ratio of on-time of the upper FET 111 to the PWM period Tc (i.e., duty ratio) is greater than 50%.

Two examples are described below that change the U-phase PWM count Cu set for each of the PWM periods Tc within the current control period Ta in such a manner as to satisfy a following first condition: the duty ratios (the PWM counts) for half of all the PWM periods Tc within the current control period Ta are set to 100% while the total of the duty ratios for the PWM periods Tc within the current control period Ta is kept unchanged. Illustrated in (a2) of FIG. 12 is a first example that satisfies the first condition by changing the duty ratios for the odd-numbered PWM periods Tc to 100% while reducing the duty ratios for the even-numbered PWM periods Tc. As can be seen from (a2) of FIG. 12, the first example reduces the number of times the upper FET 111 is switched within the current control period Ta.

Illustrated in (a3) of FIG. 12 is a second example that satisfies the first condition by changing the duty ratio for each of the PWM periods Tc within the current control period Ta such that the duty ratio alternates between 100% and a value other than 100% every two PWM periods Tc. Similar to the first example, the second example also reduces the number of times the upper FET 111 is switched within the current control period Ta. Illustrated in (b1) of FIG. 12 is an on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (b1) of FIG. 12, the ratio of on-time of the upper FET 111 to the PWM period Tc (i.e., duty ratio) is less than 50%.

Two examples are described below that change the U-phase PWM count Cu set for each of the PWM periods Tc within the current control period Ta in such a manner as to satisfy a following second condition: the duty ratios (the PWM counts) for half of all the PWM periods Tc within the current control period Ta are set to 0% while the total of the duty ratios for the PWM periods Tc within the current control period Ta is kept unchanged. Illustrated in (b2) of FIG. 12 is a first example that satisfies the second condition by changing the duty ratios for the odd-numbered PWM periods Tc to 0% while increasing the duty ratios for the even-numbered PWM periods Tc. As can be seen from (b2) of FIG. 12, the first example reduces the number of times the upper FET 111 is switched within the current control period Ta.

Illustrated in (b3) of FIG. 12 is a second example that satisfies the second condition by changing the duty ratio for each of the PWM periods Tc within the current control period Ta such that the duty ratio alternates between 0% and a value other than 0% every two PWM periods Tc. Similar to the first example, the second example also reduces the number of times the upper FET 111 is switched within the current control period Ta. In conclusion, when the carrier waveform is a sawtooth wave, and the upper FETs 111, 113, and 115 of the respective phases are controlled in the first on-off pattern, it is possible to reduce the total number of times the FETs of the motor drive circuit 32 are switched within the current control period Ta by changing the PWM counts of at least one of the phases for the PWM periods Tc within the current control period Ta in such a manner as to satisfy one of conditions A3 and B3 described below.

The condition A3 is that the duty ratio for at least one of the PWM periods Tc within the current control period Ta is set to 100% while the total of the duty ratios for the PWM periods Tc within the current control period Ta is kept unchanged. The condition B3 is that the duty ratio for at least one of the PWM periods Tc within the current control period Ta is set to 0% while the total of the duty ratios for the PWM periods Tc within the current control period Ta is kept unchanged. Further, in order to avoid a situation where the smoothing capacitor 101 (refer to FIG. 3) remains in discharge mode throughout a certain PWM period Tc, it is preferable that the PWM counts be changed such that a situation does not occur in any of the PWM periods Tc where one phase has a duty ratio of 100% while another phase has a duty ratio of 0%.

With reference to the flowchart of FIG. 8, it is described how the switching frequency reducer 47 operates when the carrier waveform is a sawtooth wave, and the upper FET of each phase is controlled in the first on-off pattern. The switching frequency reducer 47 (refer to FIG. 2) first sets U-phase, V-phase, and W-phase PWM counts Cu, Cv, and Cw (i.e., first PWM counts) for the next current control period Ta that are supplied from the PWM duty calculator 46, respectively as U-phase, V-phase, and W-phase PWM counts Cu, Cv, and Cw (i.e., second PWM counts) for each of the PWM periods Tc within the next current control period Ta (step S1).

FIG. 13A illustrates examples of the U-phase, V-phase, and W-phase PWM counts Cu, Cv, and Cw set in step S1 for each of the PWM periods Tc within the current control period Ta. Then, the switching frequency reducer 47 sets variations for the U-phase, V-phase, and W-phase to reduce the number of times of switching (step S2). Specifically, the switching frequency reducer 47 sets the variations for the U-phase, V-phase, and W-phase to change the respective PWM counts such that one of the conditions A3 and B3 is satisfied in each phase.

Adding, to the PWM count of a certain phase set for each of the PWM periods Tc within the current control period Ta, variations based on, for example, a first variation pattern illustrated in FIG. 13B or a second variation pattern illustrated in FIG. 13B makes it possible to change the PWM count of the certain phase without changing the total of the PWM counts of the certain phase within the current control period Ta. In FIG. 13B, "x" represents a variation definition value that defines the absolute value of the variations. When the carrier waveform is a sawtooth wave, and the upper FET of each phase is controlled in the first on-off pattern, it is possible to use either of the first variation pattern and the second variation pattern to satisfy the conditions A3 and B3. The following description assumes that the first variation pattern is used to change the PWM count of each phase (i.e., U-phase, V-phase, and W-phase).

How the switching frequency reducer 47 calculates the variation definition value x individually for each phase is described below. First, the switching frequency reducer 47 classifies each of the U-phase, V-phase, and W-phase into either a high-count phase or a low-count phase. When the PWM count of a certain phase that is set in step S1 for each of the PWM periods Tc (in this embodiment, identical to the PWM count set for the current control period Ta, supplied from the PWM duty calculator 46) is greater than or equal to one-half of the maximum PWM count, the certain phase is classified as the high-count phase. In contrast, when the PWM count of the certain phase is less than one-half of the maximum PWM count, the certain phase is classified as the low-count phase. In this example, since the maximum PWM count is 1,000, one-half of the maximum PWM count is 500.

Alternatively, when the PWM count of a certain phase that is set in step S1 for each of the PWM periods Tc is greater than one-half of the maximum PWM count, the certain phase may be classified as the high-count phase, and when the PWM count of the certain phase is less than or equal to one-half of the maximum PWM count, the certain phase may be classified as the low-count phase. Next, the switching frequency reducer 47 calculates a first difference between the PWM count of the high-count phase set for each of the PWM periods Tc and the maximum PWM count by subtracting the PWM count of the high-count phase from the maximum PWM count, and sets the first difference as the variation definition value x for the high-count phase. Further, the switching frequency reducer 47 calculates a second difference between the PWM count of the low-count phase set for each of the PWM periods Tc and the minimum PWM count (0) by subtracting the minimum PWM count from the PWM count of the low-count phase, and sets the second difference as the variation definition value x for the low-count phase.

In the example illustrated in FIG. 13A, the U-phase PWM count Cu is 800, i.e., greater than or equal to one-half of the maximum PWM count. Therefore, the variation definition value x for the U-phase is 200 (=1,000−800). The V-phase PWM count Cv is 600, i.e., greater than or equal to one-half of the maximum PWM count. Therefore, the variation definition value x for the V-phase is 400 (=1,000−600). The W-phase PWM count Cw is 200, i.e., less than one-half of the maximum PWM count. Therefore, the variation definition value x for the W-phase is 200 (=200−0).

The switching frequency reducer 47 sets the variations of the respective phases for each of the PWM periods Tc on the basis of the calculated variation definition values x and the variation patterns of the respective phases (in this example, the first variation pattern is applied to each phase). FIG. 13C illustrates the variations of the U-phase, V-phase, and W-phase that are set on the basis of the PWM counts of the respective phases for each of the PWM periods Tc illustrated in FIG. 13A.

After setting the variations, the switching frequency reducer 47 performs a PWM count change process to change the PWM count of each phase (step S3). Specifically, the switching frequency reducer 47 changes the PWM count of each phase set in step S1 according to the variations of the corresponding phase. More specifically, the switching frequency reducer 47 adds, to the PWM count of each phase set in step S1 for each of the PWM periods Tc, the variations of the corresponding phase, thereby changing the PWM count of each phase set for each of the PWM periods Tc. Then, the switching frequency reducer 47 finishes the PWM count change process.

Next, the switching frequency reducer 47 supplies the U-phase, V-phase, and W-phase PWM counts Cu, Cv, and Cw for each of the PWM periods Tc that have been subjected to the PWM count change process through step S3, to the PWM outputter 48 respectively as final U-phase, V-phase, and W-phase PWM counts Cu, Cv, and Cw for each of the PWM periods Tc within the next current control period Ta (step 4). After that, the switching frequency reducer 47 finishes the switching frequency reduction processing in the present current control period Ta.

When the PWM counts of the respective phases are set in step S1 for each of the PWM periods Tc as illustrated in FIG. 13A, and the variations of the respective phases are set as illustrated in FIG. 13C, the final U-phase, V-phase, and W-phase PWM counts Cu, Cv, and Cw for each of the PWM periods Tc are set as illustrated in FIG. 13D. As illustrated in FIG. 13D, for the PWM period Tc with the period number i=1, 3, 5, or 7, each of the U-phase PWM count Cu and the V-phase PWM count Cv is changed to 1,000. Thus, for the PWM period Tc with the period number i=1, 3, 5, or 7, the duty ratio of each of the U-phase and the V-phase is changed to 100%. On the other hand, for the PWM period Tc with the period number i=2, 4, 6, or 8, the W-phase PWM count Cw is changed to zero. Thus, for the PWM period Tc with the period number i=2, 4, 6, or 8, the duty ratio of the W-phase is changed to 0%. However, the total of the PWM counts for the PWM periods Tc within the current control period Ta remains unchanged in each phase between FIG. 13A and FIG. 13D.

In summary, according to the example illustrated in FIGS. 13A to 13D, the U-phase and V-phase PWM counts Cu and Cv for each of the PWM periods Tc within the current control period Ta are changed such that the condition A3 is satisfied. On the other hand, the W-phase PWM count Cw for each of the PWM periods Tc within the current control period Ta is changed such that the condition B3 is satisfied. Thus, in this example, the number of times each of the FETs 111 to 116 of the respective phases of the motor drive circuit 32 is switched is reduced.

As can be seen from FIG. 13D, a situation does not occur in any of the PWM periods Tc where one phase has a PWM count of 1,000 while another phase has a PWM count of zero. Thus, the smoothing capacitor 101 is charged and discharged in each of the PWM periods Tc. This is achieved when the variation pattern used to change the PWM counts of one phase for some of the PWM periods Tc to 1,000 is the same as the variation pattern used to change the PWM counts of another phase for some of the PWM periods Tc to zero.

The following describes a case where the upper FETs 111, 113, and 115 of the respective phases are controlled in the second on-off pattern when the carrier waveform is a sawtooth wave. An example of how to calculate a U-phase PWM count Cu for the current control period Ta in this case is described below. The PWM duty calculator 46 calculates a U-phase PWM count Cu for a certain current control period Ta on the basis of the following equation (5), by using the maximum PWM count and the U-phase voltage command value $V_U^*$ for the certain current control period Ta that is obtained by the two-phase to three-phase converter 45.

$$Cu = \text{the maximum } PWM \text{ count} - \{V_U^* \times (\text{the maximum } PWM \text{ count}/Vb)\} = 1{,}000 - \{V_U^* \times (1{,}000/Vb)\} \quad (5)$$

In the equation (5), Vb represents the power supply voltage of the motor drive circuit 32 (i.e., the output voltage of the power source 100). Using the V-phase voltage command value $V_V^*$ instead of the U-phase voltage command value $V_U^*$ on the right hand side of the equation (5) calculates a V-phase PWM count Cv. Likewise, using the W-phase voltage command value Vw* instead of the U-phase voltage command value $V_U^*$ on the right hand side of the equation (5) calculates a W-phase PWM count Cw.

Figure 14:
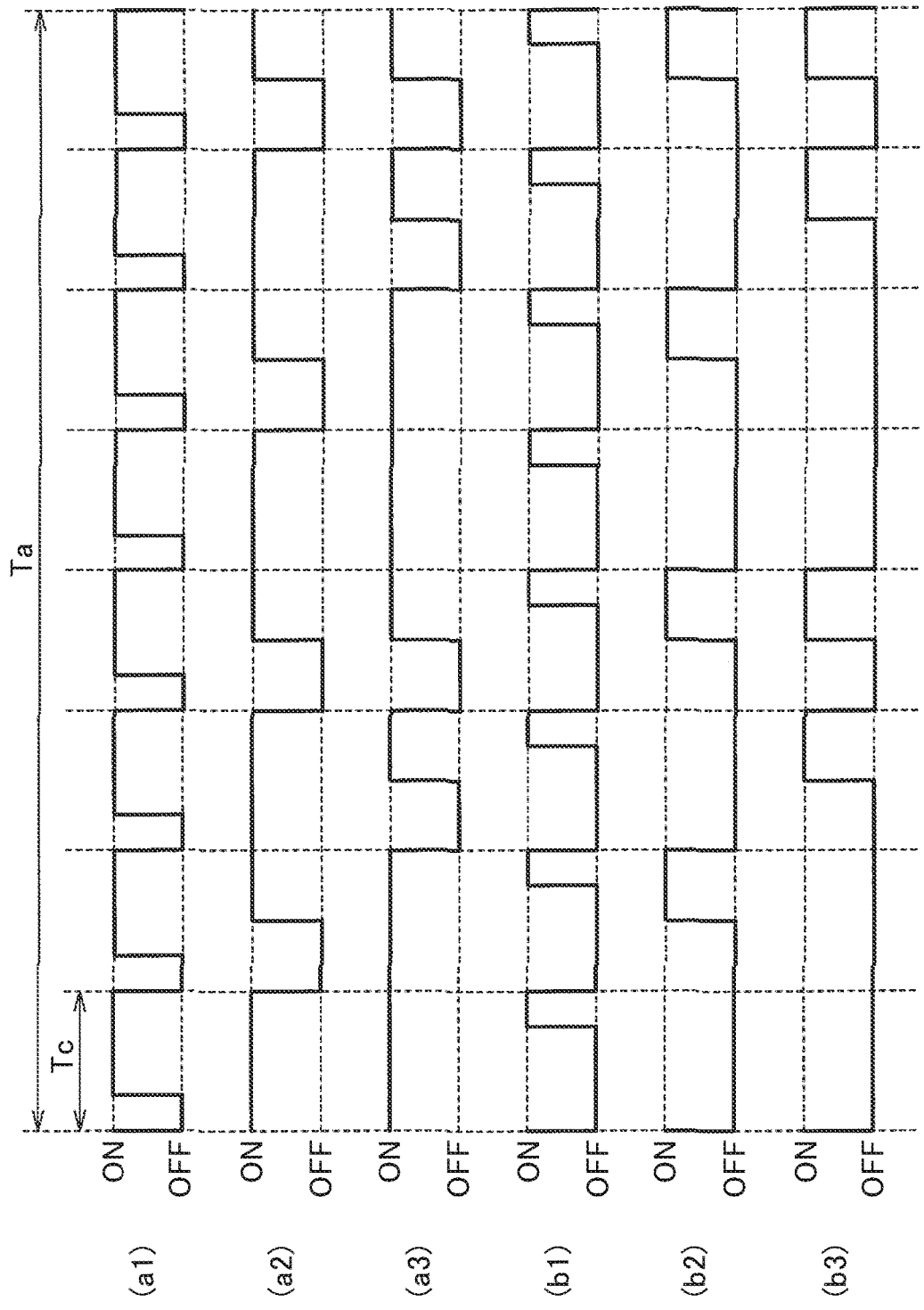
FIG. 14 is a diagram explaining a basic concept of how the switching frequency reducer reduces the number of times of switching.

The switching frequency reducer 47 operates as described below, when the carrier waveform is a sawtooth wave, and the upper FETs 111, 113, and 115 of the respective phases are controlled in the second on-off pattern. A basic concept of how the switching frequency reducer 47 reduces the number of times of switching is described with reference to FIG. 14. Illustrated in (a1) of FIG. 14 is an on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (a1) of FIG. 14, the ratio of on-time of the upper FET 111 to the PWM period Tc (i.e., duty ratio) is greater than 50%.

Two examples are described below that change the U-phase PWM count Cu set for each of the PWM periods Tc within the current control period Ta in such a manner as to satisfy a following first condition: the duty ratios (the PWM counts) for half of all the PWM periods Tc within the current control period Ta are set to 100% while the total of the duty ratios for the PWM periods Tc within the current control period Ta is kept unchanged. Illustrated in (a2) of FIG. 14 is a first example that satisfies the first condition by changing the duty ratios for the odd-numbered PWM periods Tc to 100% while reducing the duty ratios for the even-numbered PWM periods Tc. As can be seen from (a2) of FIG. 14, the first example reduces the number of times the upper FET 111 is switched within the current control period Ta.

Illustrated in (a3) of FIG. 14 is a second example that satisfies the first condition by changing the duty ratio for each of the PWM periods Tc within the current control period Ta such that the duty ratio alternates between 100% and a value other than 100% every two PWM periods Tc. Similar to the first example, the second example also reduces the number of times the upper FET 111 is switched within the current control period Ta. Illustrated in (b1) of FIG. 14 is an on-off state of the U-phase upper FET 111 in each of the PWM periods Tc within a certain current control period Ta after the U-phase PWM count Cu is set for each of the PWM periods Tc and before the U-phase PWM count Cu set for each of the PWM periods Tc is changed. In the example illustrated in (b1) of FIG. 14, the ratio of on-time of the upper FET 111 to the PWM period Tc (i.e., duty ratio) is less than 50%.

Two examples are described below that change the U-phase PWM count Cu set for each of the PWM periods Tc within the current control period Ta in such a manner as to satisfy a following second condition: the duty ratios (the PWM counts) for half of all the PWM periods Tc within the current control period Ta are set to 0% while the total of the duty ratios for the PWM periods Tc within the current control period Ta is kept unchanged. Illustrated in (b2) of FIG. 14 is a first example that satisfies the second condition by changing the duty ratios for the odd-numbered PWM periods Tc to 0% while increasing the duty ratios for the even-numbered PWM periods Tc. As can be seen from (b2) of FIG. 14, the first example reduces the number of times the upper FET 111 is switched within the current control period Ta.

Illustrated in (b3) of FIG. 14 is a second example that satisfies the second condition by changing the duty ratio for each of the PWM periods Tc within the current control period Ta such that the duty ratio alternates between 0% and a value other than 0% every two PWM periods Tc. Similar to the first example, the second example also reduces the number of times the upper FET 111 is switched within the current control period Ta. In conclusion, when the carrier waveform is a sawtooth wave, and the upper FETs 111, 113, and 115 of the respective phases are controlled in the second on-off pattern, it is possible to reduce the total number of times the FETs of the motor drive circuit 32 are switched within the current control period Ta by changing the PWM counts of at least one of the phases for the PWM periods within the current control period Ta in such a manner as to satisfy one of conditions A4 and B4 described below.

The condition A4 is that the duty ratio for at least one of the PWM periods Tc within the current control period Ta is set to 100% while the total of the duty ratios for the PWM periods Tc within the current control period Ta is kept unchanged. The condition B4 is that the duty ratio for at least one of the PWM periods Tc within the current control period Ta is set to 0% while the total of the duty ratios for the PWM periods Tc within the current control period Ta is kept unchanged. The condition A4 is the same as the condition A3, and the condition B4 is the same as the condition B3.

Further, in order to avoid a situation where the smoothing capacitor 101 (refer to FIG. 3) remains in discharge mode throughout a certain PWM period Tc, it is preferable that the PWM counts be changed such that a situation does not occur in any of the PWM periods Tc where one phase has a duty ratio of 100% while another phase has a duty ratio of 0%. When the carrier waveform is a sawtooth wave, and the upper FET of each phase is controlled in the second on-off pattern, the switching frequency reducer 47 operates in the same manner as when the carrier waveform is a sawtooth wave, and the upper FET of each phase is controlled in the first on-off pattern. However, in this case, the duty ratio for the PWM period Tc that has the PWM count changed to the maximum PWM count (1,000) becomes 0%, and the duty ratio for the PWM period Tc that has the PWM count changed to the minimum PWM count (0) becomes 100%.

According to the embodiment, the same variation pattern is used to change the PWM count of each phase. Alternatively, different variation patterns may be used to change the PWM counts of any two of the phases. Although the embodiment illustrates that a motor control unit according to the invention is used in electric power steering systems, the motor control unit may be used in apparatuses or systems other than electric power steering systems.

Other modifications are possible within the scope of the claimed invention.

What is claimed is:

1. A motor control unit including a drive circuit that supplies electric power to an electric motor and that has a plurality of series circuits each of which includes upper switching element and lower switching element connected in series with each other, each series circuit connected in parallel to a power source and provided for a corresponding one of a plurality of phases of the electric motor, the motor control unit configured to control the switching elements of the drive circuit on a basis of pulse width modulation (PWM) signals that are generated for each of a plurality of PWM periods included in a current control period, the motor control unit comprising:
    a PWM count calculator that calculates first PWM counts of the plurality of phases, each first PWM count being calculated for the current control period;
    a PWM count setter that sets the first PWM count of each of the plurality of phases as a second PWM count of a corresponding one of the plurality of phases, the second PWM count being set for each of the plurality of PWM periods within the current control period; and
    a PWM count changer that changes the second PWM count of at least one of the plurality of phases, without changing a total of the second PWM counts of the at least one phase within the current control period, such that a number of times the switching elements corresponding to the at least one phase are switched within the current control period is reduced.

2. The motor control unit according to claim 1, wherein the PWM count changer changes the second PWM count of the at least one phase by adding or subtracting a PWM count deviation to or from the second PWM count of the at least one phase for at least two of the plurality of PWM periods within the current control period, and
the PWM count deviation is a difference between the second PWM count of the at least one phase and one of a maximum PWM count and a minimum PWM count.

3. The motor control unit according to claim 2, wherein when the second PWM count of the at least one phase is greater than one-half of the maximum PWM count, the PWM count changer uses, as the PWM count deviation, the difference between the second PWM count of the at least one phase and the maximum PWM count,
when the second PWM count of the at least one phase is less than one-half of the maximum PWM count, the PWM count changer uses, as the PWM count deviation, the difference between the second PWM count of the at least one phase and the minimum PWM count, and
when the second PWM count of the at least one phase is equal to one-half of the maximum PWM count, the PWM count changer uses, as the PWM count deviation, the difference between the second PWM count of the at least one phase and one of the maximum PWM count and the minimum PWM count.

4. The motor control unit according to claim 2, wherein the PWM count changer alternates between adding the PWM count deviation to the second PWM count and subtracting the PWM count deviation from the second PWM count every two or more of the PWM periods within the current control period.

5. The motor control unit according to claim 3, wherein the PWM count changer alternates between adding the PWM count deviation to the second PWM count and subtracting the PWM count deviation from the second PWM
count every two or more of the PWM periods within the current control period.

* * * * *